(12) United States Patent
Qiao

(10) Patent No.: US 9,680,284 B2
(45) Date of Patent: Jun. 13, 2017

(54) LESSENING VARIATIONS OF SPECTRAL CHARACTERISTIC OF AN OPTICAL DEVICE

(71) Applicant: Lijie Qiao, Ottawa (CA)

(72) Inventor: Lijie Qiao, Ottawa (CA)

( * ) Notice: Subject to any disclaimer, the term of this patent is extended or adjusted under 35 U.S.C. 154(b) by 0 days.

(21) Appl. No.: 14/881,198

(22) Filed: Oct. 13, 2015

(65) Prior Publication Data
US 2016/0064890 A1  Mar. 3, 2016

Related U.S. Application Data

(63) Continuation-in-part of application No. 14/469,661, filed on Aug. 27, 2014, now Pat. No. 9,184,554.

(60) Provisional application No. 62/870,248, filed on Aug. 27, 2013, provisional application No. 62/102,102, filed on Jan. 12, 2015.

(51) Int. Cl.
| | |
|---|---|
| H01S 3/10 | (2006.01) |
| G02F 1/01 | (2006.01) |
| G02F 1/09 | (2006.01) |
| H01S 3/067 | (2006.01) |
| H04B 10/29 | (2013.01) |
| H01S 3/13 | (2006.01) |
| G02F 1/19 | (2006.01) |
| H01S 3/23 | (2006.01) |
| H01S 3/30 | (2006.01) |

(52) U.S. Cl.
CPC .......... *H01S 3/1003* (2013.01); *G02F 1/0136* (2013.01); *G02F 1/09* (2013.01); *G02F 1/19* (2013.01); *H01S 3/1302* (2013.01); *H01S 3/2391* (2013.01); *H01S 3/302* (2013.01); *H04B 10/29* (2013.01); *H01S 3/06754* (2013.01); *H01S 2301/04* (2013.01)

(58) Field of Classification Search
CPC ... H01S 3/06754; H01S 3/1003; G02F 1/0136
See application file for complete search history.

(56) References Cited

U.S. PATENT DOCUMENTS

| | | | |
|---|---|---|---|
| 6,535,329 B1 | 3/2003 | Pelard et al. | 359/337 |
| 6,728,434 B2 | 4/2004 | Flanders | 385/18 |
| 7,196,847 B2 * | 3/2007 | Ye | G02B 27/286 |
| | | | 359/484.06 |

(Continued)

FOREIGN PATENT DOCUMENTS

| | | | | |
|---|---|---|---|---|
| EP | 1111743 A2 | 6/2001 | | H01S 3/131 |
| EP | 1246322 A2 | 10/2002 | | H01S 3/067 |

*Primary Examiner* — Eric Bolda
(74) *Attorney, Agent, or Firm* — Teitelbaum & MacLean; Neil Teitelbaum; Doug MacLean

(57) ABSTRACT

Devices and methods for lessening a thermal dependence of gain profile of an optical amplifier are disclosed. An optical beam is split in a plurality of sub-beams with a thermally variable power splitting ratio, e.g. one sub-beam may travel a longer optical path length than another. When the sub-beams are recombined, they interfere with each other, causing the throughput to be wavelength dependent. An amplitude of this wavelength dependence is thermally variable due to the thermally variable power splitting ratio. The thermally variable power splitting ratio and the optical path length difference are selected so as to offset a thermal variation of a spectral gain profile of an optical amplifier.

12 Claims, 18 Drawing Sheets

(56) References Cited

U.S. PATENT DOCUMENTS

| | | | |
|---|---|---|---|
| 2002/0071624 A1* | 6/2002 | Frisken | G02B 6/272 |
| | | | 385/11 |
| 2002/0109907 A1 | 8/2002 | Chen et al. | 359/337 |
| 2004/0001255 A1* | 1/2004 | Fratello | G02B 5/3025 |
| | | | 359/484.03 |
| 2015/0146291 A1* | 5/2015 | Mao | G02F 1/0136 |
| | | | 359/484.02 |
| 2016/0033556 A1* | 2/2016 | Mueller | G01R 15/246 |
| | | | 324/96 |

* cited by examiner

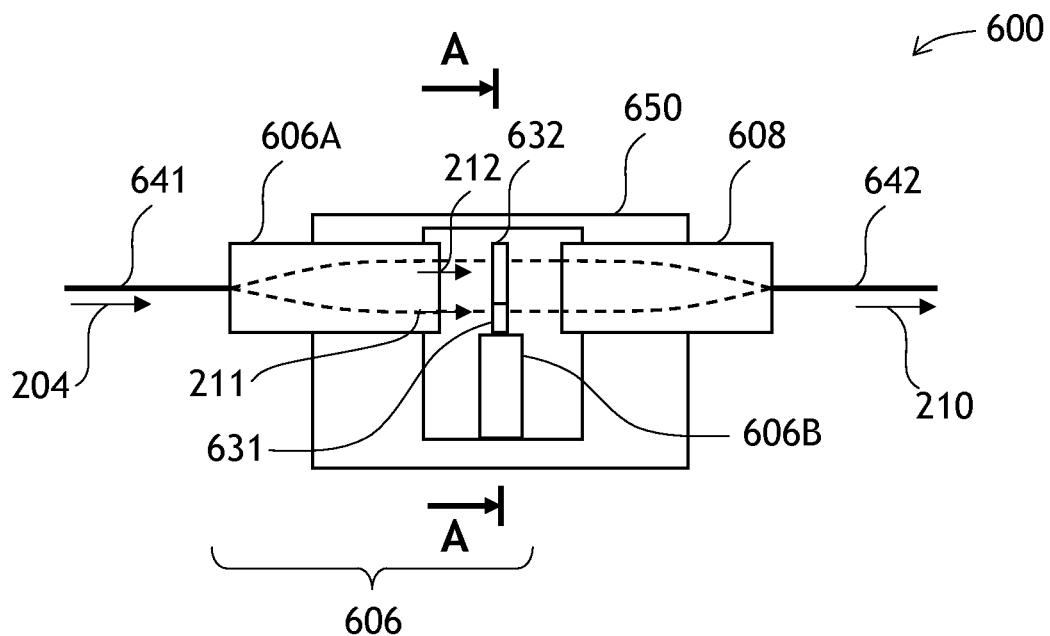
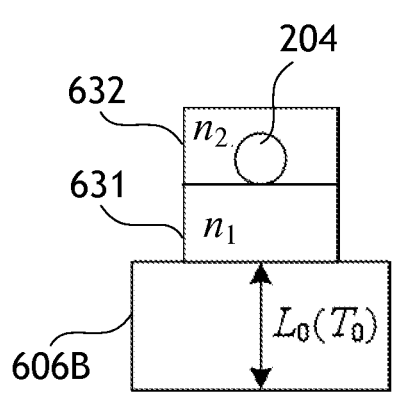 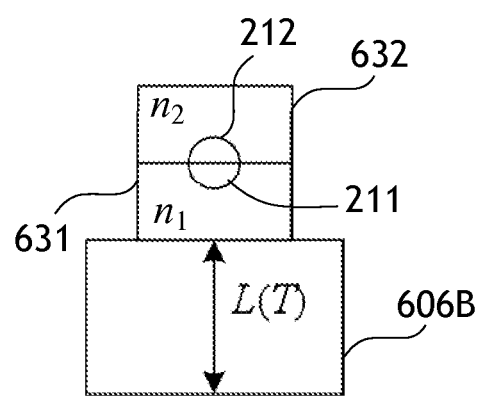
FIG. 6A
FIG. 6B        FIG. 6C

LESSENING VARIATIONS OF SPECTRAL CHARACTERISTIC OF AN OPTICAL DEVICE

CROSS-REFERENCE TO RELATED APPLICATIONS

The present application is a continuation-in-part of U.S. patent application Ser. No. 14/469,661, filed Aug. 27, 2014, which claims priority to U.S. Provisional Application No. 62/870,248, filed Aug. 27, 2013. The present application also claims priority to U.S. Provisional Application No. 62/102,102 filed Jan. 12, 2015. The entireties of these applications are hereby incorporated by reference.

TECHNICAL FIELD

The present invention relates to optical devices having a wavelength-dependent parameter, and in particular to devices and methods for lessening a variation of a wavelength-dependent parameter.

BACKGROUND OF THE INVENTION

In a wavelength division multiplexing (WDM) optical transmission system, optical signals at different wavelengths are encoded with digital streams of information. These "wavelength channels" are combined together and transmitted through a series of spans of optical fiber. At a receiver end of a transmission link, the wavelength channels are separated, and each wavelength channel is individually detected.

While propagating through an optical fiber, light becomes attenuated. Yet some minimal level of optical power is required at the receiver end to decode information that has been encoded at the transmitter end. To boost optical signals propagating in an optical fiber, optical amplifiers are deployed throughout the transmission link. Optical amplifiers extend a maximum length of the link, in some instances, from a few hundred kilometers to several thousand kilometers, by amplifying optical signals to power levels close to the original levels of optical power.

A spectral gain profile is an important characteristic of an optical amplifier. In most instances it is desired to have a flat spectral gain profile, so that all wavelength channels are amplified similarly. Since an inherent gain profile of most optical amplifiers is not flat, gain flattening optical filters (GFFs) are often employed which attenuate gain peak or peaks of an optical amplifier, typically achieving a spectral flatness of approximately ±0.5 dB. However, the gain profile of many amplifiers, particularly an erbium doped fiber amplifier (EDFA), is dependent on temperature, so a good spectral flatness is only achievable in a narrow temperature range. To keep the gain profile flat at a wide range of ambient temperatures, the thermal dependence of an optical amplifier gain needs to be reduced or externally compensated.

One method to reduce thermally induced EDFA gain variations is to thermally stabilize the active optical fiber of EDFA, that is, the erbium doped fiber (EDF). By way of example, Pelard et al. in U.S. Pat. No. 6,535,329 incorporated herein by reference, disclose stabilizing a spool of EDF by heating the EDF spool to an elevated temperature and providing an optical feedback loop by measuring optical spectrum of optical signal amplified by the EDFA. Referring to FIG. 1, a Pelard apparatus 10 includes an EDF spool 33 in a package 30, an optical spectrum analyzer (OSA) 35, a computer 37, and a heating element 39. In operation, a portion of an output optical signal amplified in the EDF spool 33 is coupled to the OSA 35, which measures a spectrum of the amplified optical signal to obtain a "gain shape". The computer 37 evaluates the spectral flatness of the gain shape, and provides a feedback control signal for the heating element 39 to heat the package 30, so as to preserve the spectral flatness.

Similarly, Flintham et al. in European Patent Application EP 1,246,322 disclose heating an EDF spool to reduce a gain deviation of an EDFA. Detrimentally, heating EDF to elevated temperatures may consume large amounts of energy and requires an extra space for thermal insulation of the EDF spool.

Chen et al. in US Patent Application Publication 2002/0109907 incorporated herein by reference disclose a dynamic compensator of thermally induced EDF gain variation including a fiber Bragg grating (FBG) having a thermally sensitive overcladding. When the temperature of the FBG is tuned, an amplitude of the Bragg grating reflection peak changes. By properly selecting a spectral shape of the transmission peak in relation to the EDF gain profile, a certain degree of thermal stabilization of EDFA gain profile may be achieved. Unfortunately, FBG-based gain stabilizers are expensive, and require sophisticated active control.

More generally, a path of an optical signal, such as an optical signal carrying wavelength channels in an optical network, may include devices or modules having a wavelength-dependent property, such as optical transmission or insertion loss, which varies with temperature, or varies with time due to some unknown reason. Of these variations, a time-varying spectral gain profile of an optical amplifier is but one example. It is generally desired to lessen such variations of wavelength-dependent properties of optical devices.

SUMMARY OF THE INVENTION

In accordance with the disclosure, an optical beam may be split in two or more sub-beams with splitting ratios dependent on temperature. The sub-beams may travel different optical path lengths. When the sub-beams are recombined, they undergo optical interference, causing the optical throughput to be wavelength dependent. An amplitude of this wavelength dependence is thermally variable due to the thermally variable power splitting ratios. The power splitting ratios and the optical path length differences may be selected so as to offset, at least partially, a thermal variation of a spectral gain profile of an optical amplifier amplifying the optical signal, a thermal variation of a spectral characteristic of a light source, or more generally a time-varying spectral response of an optical device.

The optical beam may be split into two sub-beams by using a variable beamsplitter. The splitting of the optical beam may be based on polarization. By way of example, variable power splitting ratio may be obtained by polarizing the optical beam, rotating the polarization of the optical beam by an angle dependent on temperature, and propagating the optical beam through a waveplate, which introduces an optical phase difference, and accordingly an optical path length difference, between the orthogonally polarized components of the optical beam.

In accordance with an aspect of the disclosure, there is provided an apparatus comprising:

a first polarizer having a polarization axis oriented in an X-direction, for polarizing an input optical beam to obtain a first optical beam having a polarization oriented in the X-direction;

a first polarization rotator optically coupled to the first polarizer and configured for rotating the polarization of the first optical beam away from the X-direction by a first angle having a pre-defined dependence on temperature, such that the polarized optical beam comprises an X-polarization component oriented in the X direction, and a Y-polarization component oriented in a Y-direction perpendicular to the X-direction;

a first waveplate optically coupled to the first polarization rotator and having an optical axis oriented substantially in the X-direction or Y-direction, for imparting a non-zero phase shift between the X- and Y-polarization components of the first optical beam;

a second polarization rotator optically coupled to the first waveplate and configured for rotating the polarization of the first optical beam by the first angle back to become oriented in the X-direction; and a second polarizer optically coupled to the second polarization rotator and having a polarization axis oriented in the X-direction, for polarizing the first optical beam to obtain an output optical beam;

wherein a coupling efficiency of the first optical beam into the output optical beam has a wavelength dependence due to the non-zero phase shift between the X- and Y-polarization components of the first optical beam; and wherein an amplitude of the wavelength dependence is dependent on the first angle and thereby has a pre-defined dependence on the temperature.

In one embodiment, the apparatus further comprises a reflector optically coupled to the first waveplate, for reflecting the first optical beam back to the first polarization rotator, wherein the first and second polarization rotators comprise a same polarization rotator. The first and second polarizers may include a same walk-off birefringent crystal.

In accordance with an aspect of the invention, there is provided a method for lessening a thermal dependence of gain of an optical amplifier, the method comprising:

(a) polarizing in an X-direction an output optical beam of the optical amplifier, so as to obtain a first optical beam having a polarization oriented in the X-direction;

(b) rotating the polarization of the first optical beam away from the X-direction by a first angle dependent on temperature, such that the polarized optical beam comprises an X-polarization component oriented in the X direction, and a Y-polarization component oriented in a Y-direction perpendicular to the X-direction;

(c) imparting a non-zero phase shift between the X- and Y-polarization components of the first optical beam, by transmitting the first optical beam through a waveplate having an optical axis oriented substantially in the X-direction or Y-direction;

(d) rotating the polarization of the first optical beam by the first angle back to the X-direction; and (e) polarizing the first optical beam in the X-direction, to obtain an output optical beam;

wherein a coupling efficiency of the first optical beam into the output optical beam has a wavelength dependence due to the non-zero phase shift between the X- and Y-polarization components of the first optical beam;

wherein an amplitude of the wavelength dependence is dependent on the first angle and thereby has a dependence on the temperature, such that the thermal dependence of gain of the optical amplifier is lessened by the dependence of the amplitude on the temperature.

In accordance with an aspect of the invention, there is provided a method for lessening a dependence of a spectral characteristic of a light source on temperature, the method comprising:

(a) polarizing in an X-direction an optical beam emitted by the light source, so as to obtain a first optical beam having a polarization oriented in the X-direction;

(b) rotating the polarization of the first optical beam away from the X-direction by a first angle dependent on temperature, such that the polarized optical beam comprises an X-polarization component oriented in the X direction, and a Y-polarization component oriented in a Y-direction perpendicular to the X-direction;

(c) imparting a non-zero phase shift between the X- and Y-polarization components of the first optical beam, by transmitting the first optical beam through a waveplate having an optical axis oriented substantially in the X-direction or Y-direction;

(d) rotating the polarization of the first optical beam by the first angle back to the X-direction; and (e) polarizing the first optical beam in the X-direction, to obtain an output optical beam;

wherein a coupling efficiency of the first optical beam into the output optical beam has a wavelength dependence due to the non-zero phase shift between the X- and Y-polarization components of the first optical beam;

wherein an amplitude of the wavelength dependence is dependent on the first angle and thereby has a dependence on the temperature, such that the dependence of the spectral characteristic of the light source on the temperature is lessened by the dependence of the amplitude on the temperature.

In accordance with one embodiment of the disclosure, there is provided an apparatus comprising:

an optical device for providing an optical beam having a spectral characteristic having a dependence on temperature;

a first lens for collimating the optical beam;

a first slab of an optically transparent material disposed partially in the optical beam, so that in operation, a first portion of the optical beam propagates within the first slab, while a second portion of the optical beam bypasses the first slab, wherein an optical path difference exists between optical paths of the first and second portions;

a block supporting the first slab, the block having a length dependent on the temperature and disposed such that when the temperature changes, the first slab moves across the input optical beam, thereby changing a power splitting ratio of the second portion optical power to the first portion optical power; and a second lens for recombining the optical beam by combining the first and second portions;

wherein an efficiency of recombining the optical beam has a wavelength dependence due to the optical path length difference;

wherein an amplitude of the wavelength dependence is dependent on the power splitting ratio and thereby has a dependence on the temperature, wherein in operation, the dependence of the spectral characteristic on the temperature is lessened.

In accordance with another aspect of the disclosure, there is further provided an apparatus comprising:

an optical device comprising a first port for inputting an optical beam for propagation through the optical device, and a second port for outputting the optical beam propagated through the optical device, wherein the optical device has a time-varying spectral response;

a variable beam splitter optically coupled to the second port and configured for splitting the optical beam into a plurality of sub-beams including first and second sub-beams, the variable beam splitter having a power splitting ratio dependent on a first control signal;

first and second optical paths for propagating the first and second sub-beams, respectively, the first and second optical paths having an optical path length difference therebetween;

a beam combiner optically coupled to the first and second optical paths, for recombining the optical beam by combining the plurality of sub-beams;

wherein an efficiency of recombining the optical beam by the beam combiner has a wavelength dependence due to the optical path length difference; and a controller operationally coupled to the variable beam splitter for providing the first control signal, wherein an amplitude of the wavelength dependence is dependent on the power splitting ratio and thereby has a dependence on the first control signal;

wherein the controller is configured to provide the first control signal to control the amplitude of the wavelength dependence so as to counter-act variation of the spectral response of the optical device with time.

BRIEF DESCRIPTION OF THE DRAWINGS

Exemplary embodiments will now be described in conjunction with the drawings, in which:

FIG. 6A is a plan cross-sectional view of one embodiment of the apparatus of FIG. 2;

FIGS. 6B and 6C are side cross-sectional views of the embodiment of FIG. 6A taken along line A-A at two different ambient temperatures;

DETAILED DESCRIPTION

Figure 1:
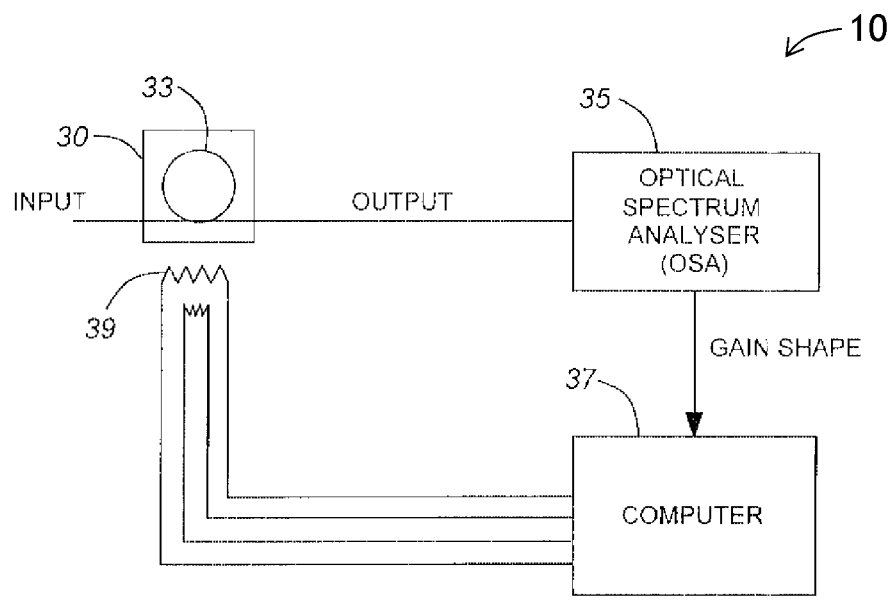
FIG. 1 is a block diagram of a prior-art system for thermally stabilizing an EDFA gain profile.

While the present teachings are described in conjunction with various embodiments and examples, it is not intended that the present teachings be limited to such embodiments. On the contrary, the present teachings encompass various alternatives and equivalents, as will be appreciated by those of skill in the art. In FIGS. 2, 6A to 6C, FIG. 7 to FIG. 13, and FIG. 20, similar reference numerals denote similar elements.

Figure 2:
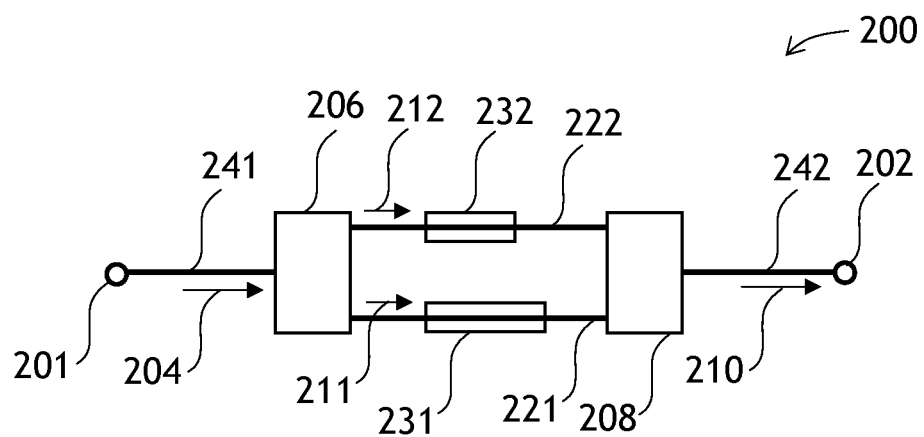
FIG. 2 is a block diagram of an apparatus for lessening a thermal dependence of gain of an optical amplifier according to one embodiment of the disclosure.

Referring to FIG. 2, an apparatus 200 of the disclosure includes an input port 201 for coupling an optical beam 204, which may propagate, for example, in an optional input optical fiber 241, or alternatively in free space. A variable beam splitter 206 is optically coupled to the input port 201 and configured for splitting the optical beam 204 into first 211 and second 212 sub-beams. The variable beam splitter 206 has an optical power splitting ratio dependent on temperature, or alternatively on an external control signal, not shown. Herein, the "power splitting ratio" is defined as the ratio of optical power levels of the first 211 and second 212 sub-beams. The variable beam splitter 206 may be passive, that is, not requiring an external power source or a control signal to operate, or active, that is, controlled by the external control signal or requiring an external power source. Exemplary embodiments of both the passive and active variable beam splitter 206 will be given further below.

In operation, the first 211 and second 212 sub-beams propagate along first 221 and second 222 optical paths, respectively. The first 221 and second 222 optical paths have different optical path lengths. To that end, the first 221 and second 222 optical paths may include first 231 and second 232 blocks of transparent material of different lengths and/or refractive indices. At least one block, slab, film, etc. of a transparent material may be placed in only one of the optical paths 221 and 222, to create the required optical path length difference.

A beam combiner 208 is optically coupled to the first 221 and second 222 optical paths. The function of the beam combiner 208 is to recombine the first 211 and second 212 sub-beams propagated along the first 221 and second optical paths 222, respectively, into a recombined optical beam 210. The efficiency of recombining the first 211 and second 212 sub-beams into the recombined optical beam 210 has a wavelength dependence due to the optical path length difference between the first 221 and second 222 optical paths.

The recombined optical beam 210 exits the apparatus 200 at an output port 202, which may be coupled to the beam combiner 208 by an optional output optical fiber 242.

The variable beam splitter 206 may split the optical beam 204 into more than two sub-beams 211 and 212, each sub-beam propagating along its own dedicated optical path. The power splitting ratio into the plurality of sub-beams may depend on temperature. Increasing the number of sub-beams may provide a more accurate compensation of thermal dependence of gain of an optical amplifier, for example.

Figure 3A:
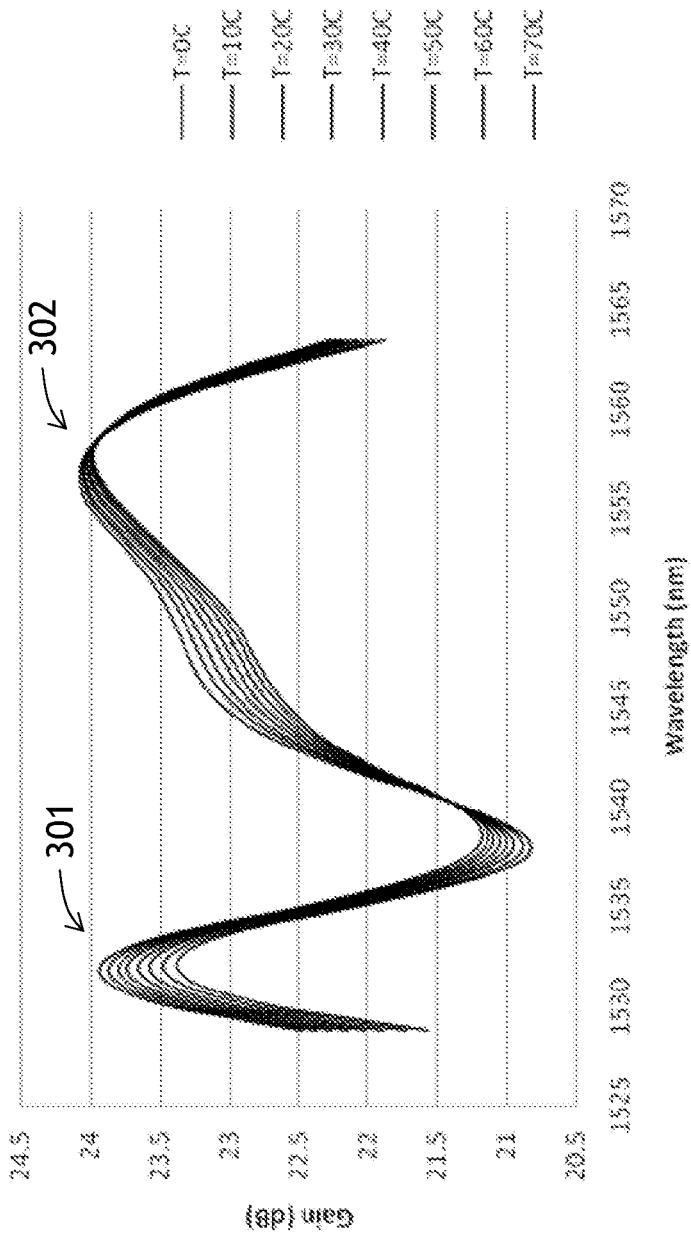
FIGS. 3A and 3B are gain profiles of unflattened (FIG. 3A) and flattened (FIG. 3B) EDFA at temperatures varying from 0° C. to 70° C.
Figure 3B:
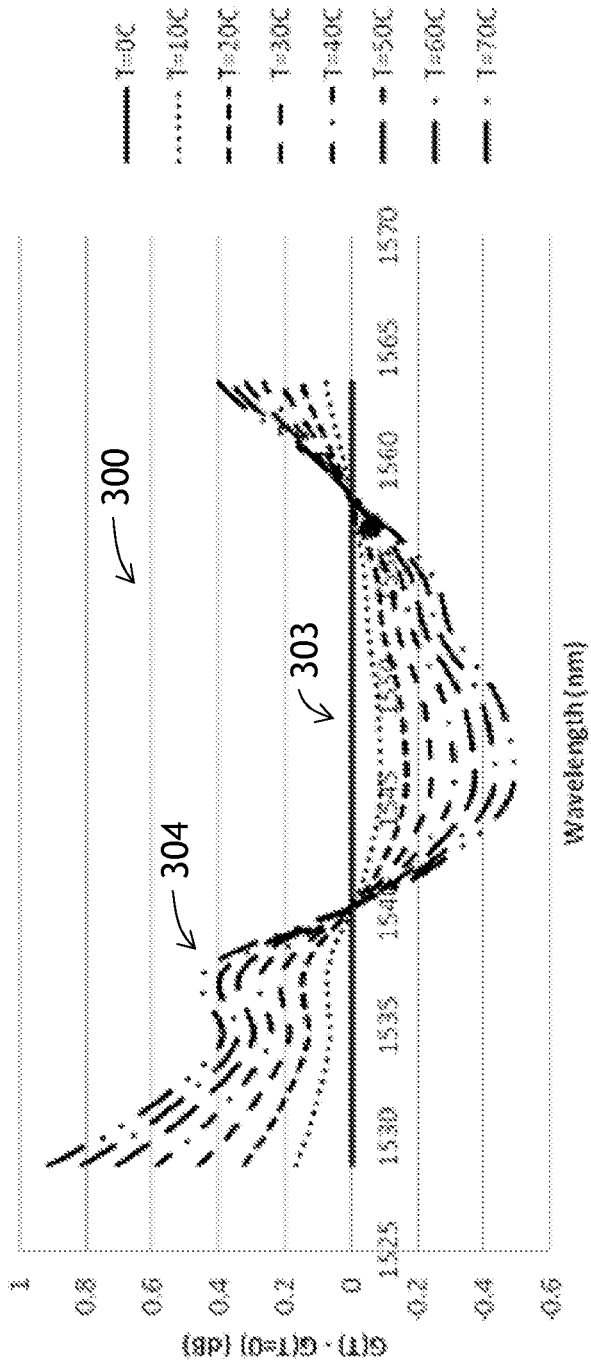

To understand how the apparatus 200 can lessen thermal dependence of gain of an optical amplifier, one may first consider a typical amplifier gain variation with temperature. Referring to FIG. 3A, an EDFA gain is depicted as a function of wavelength for eight temperature values ranging from 0° C. to 70° C., with a 10° C. interval. One can see that the temperature change causes a rather complex transformation of gain peaks 301 and 302, including peak wavelength shift, peak amplitude change, and even a shape change of the right-hand peak 302. In FIG. 3B, an equalized EDFA spectral gain profile 300, e.g. using a GFF, is depicted at same temperature conditions. One can see that changes of equalized EDFA gain appear somewhat simpler, having approximately a V shape centered around a location 303 with a ripple or kink appearing at 304, the amplitude of the V shape changing with temperature.

Figure 4:
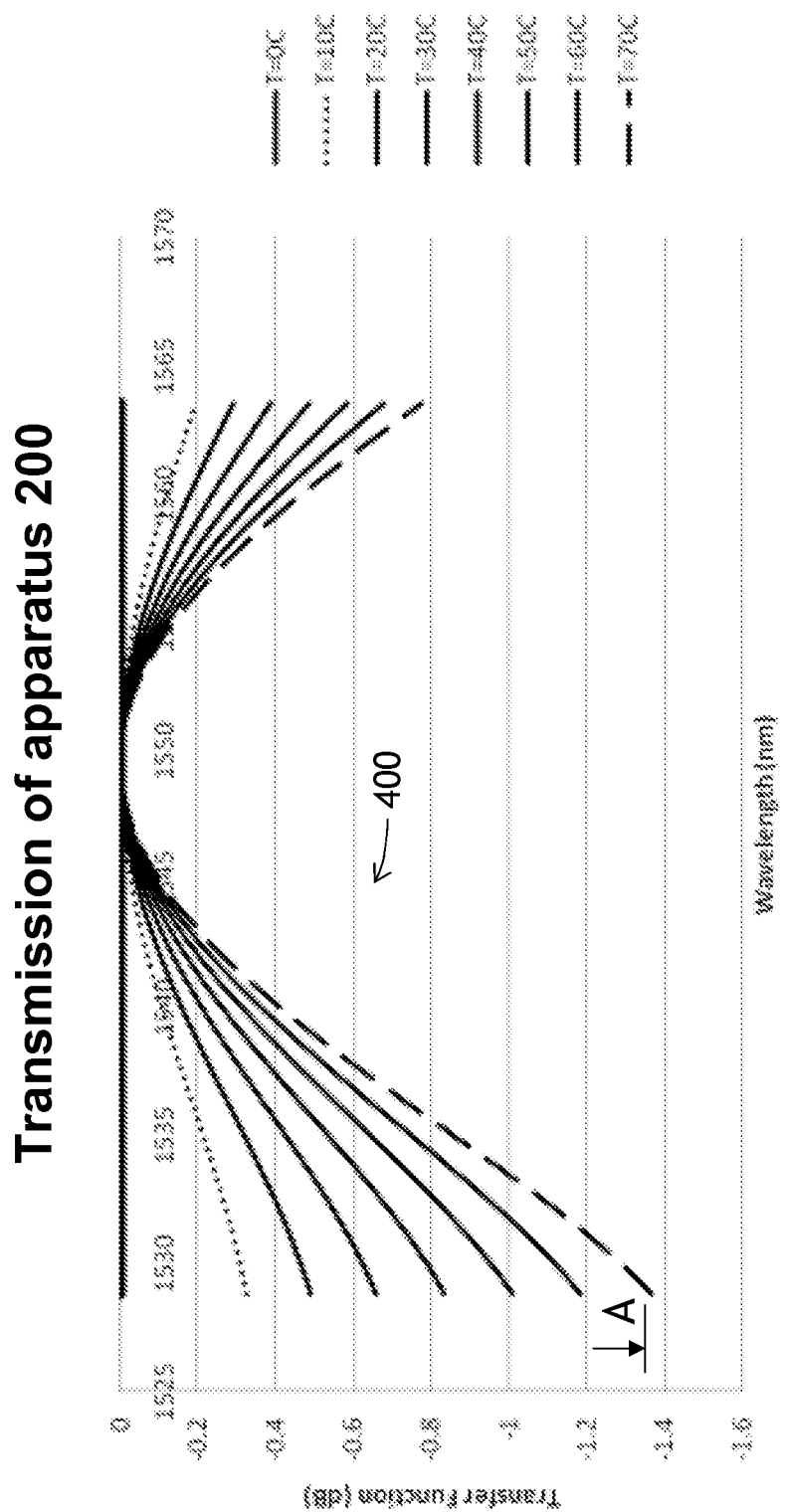
FIG. 4 is a throughput wavelength dependence of an apparatus of FIG. 2 at temperatures varying from 0° C. to 70° C.

The variable beam splitter 206, the first 221 and second 222 optical paths, and the beam combiner 208 (FIG. 2) form a Mach-Zehnder interferometer. Referring to FIG. 4 with further reference to FIGS. 2 and 3B, a bell-shaped wavelength-dependent transmission function 400 is a typical Mach-Zehnder transmission function, which is a result the optical interference of the first 211 and second 212 sub-beams. An amplitude A of the bell-shaped wavelength dependent transmission function 400 is dependent on the power splitting ratio of the variable beam splitter 206. Since the power splitting ratio depends on the temperature, the amplitude A is dependent on the temperature, as shown in FIG. 4. The transmission function 400 can be represented by the following equation:

$$R(T, \lambda) = r^2 + (1-r)^2 + 2r(1-r)\cos\left(2\pi \frac{OPD}{\lambda}\right)] \quad (1)$$

where $R(T,\lambda)$ represents the transmission function 400 dependent on temperature T and wavelength $\lambda$, OPD is the optical path length difference between the first 221 and second 222 optical paths, and $r=r(T)$ is a temperature dependent power splitting ratio of the variable beam splitter 206. The optical power in the first sub-beam 211 is $$P_1 = rP_{in} \quad (2)$$

and the optical power in the second sub-beam 212 is $$P_2 = (1-r)P_{in} \quad (3)$$

where $P_{in}$ is the optical power of the input optical beam 204, not counting optical losses in the variable beam splitter 206.

Figure 5:
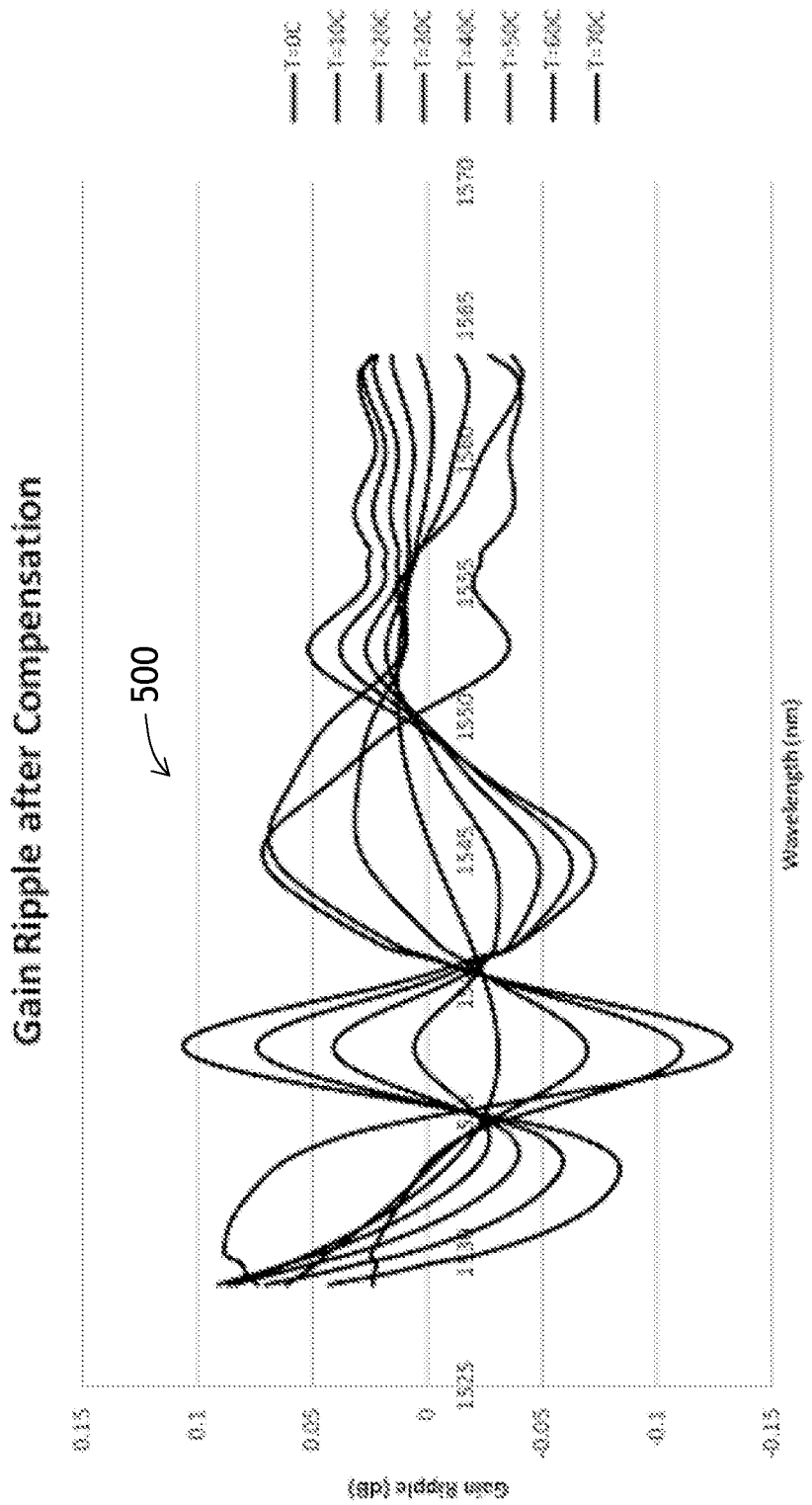
FIG. 5 is a simulated difference between the gain profile of FIG. 3B and the wavelength dependence of FIG. 4 at temperatures varying from 0° C. to 70° C.

According to the invention, the OPD value and the function r(T) in Eq. (1) above are selected so as to lessen the thermal dependence of gain of the optical amplifier by the dependence of the amplitude A on the temperature. The V-shaped spectral gain profile 300 (FIG. 3B) of the equalized EDFA gain may be lessened by the bell-shaped wavelength-dependent transmission function 400 (FIG. 4) of the apparatus 200 (FIG. 2). An example of such a compensation is shown in FIG. 5, where the transmission function 400 is subtracted from the V-shaped spectral gain profile 300 of FIG. 3B. The amplitude A has been adjusted for each temperature between 0° C. to 70° C. One can see that the resulting spectral ripple 500 is rather small, less than +−0.15 dB, across the temperature range of between 0° C. to 70° C. In the simulation of FIG. 5, r=0 at 0° C., and r≈0.08 at 70° C.; and the OPD is about 45 micrometers for C-band; and 48 micrometers for L-band. These values of the OPD between the first 221 and second 222 optical paths are only examples meant for illustration of required material thicknesses and distances. For instance, when the first 231 and second 232 blocks are made out of fused silica having a refractive index of 1.44 at a C-band wavelength of 1.45 micrometers, the first 231 and second 232 blocks have a length difference 45/(1.44−1.0)=102.3 micrometers. More generally, the OPD may be selected so that the transmission function 400 of FIG. 4, which represents the wavelength dependence of the coupling efficiency of the first 211 and second 212 sub-beams into the recombined beam 210, has a period of at least 40 nm.

Exemplary implementations of the apparatus 200 of FIG. 2 will now be considered in detail. Referring to FIGS. 6A to 6C, an apparatus 600 (FIG. 6A) includes first 606A and second 608 lenses fixed within a housing 650. Also fixed within the housing 650 is a block 606B supporting first 631 and second 632 adjacent slabs, which may be made of a same optical material or different optical materials. The block 606B has a non-zero thermal expansion coefficient, causing the block 606B to expand and contract with temperature.

The first 631 and the second 632 slabs have different optical path lengths. For example, the first 631 and the second 632 slabs can have a different physical thickness and be made out of a same material, or the first 631 and the second 632 slabs can have a same physical thickness and be made out of different materials, or both. It is also possible that one of the slabs 631 and 632 is omitted entirely. In the latter case, only one of the first and second sub-beams propagates in the present slab, e.g. only the first sub-beam 211 propagates in the first slab 631, and the other sub-beam 212 bypasses the first slab 631, that is, propagates in air above the first slab 631. Since the required thickness is typically quite small e.g. ≤0.1 mm, a thin optical film may be used in place of the single slab 632 or 631.

In operation, the input optical beam 204 propagating in an input optical fiber 641 is collimated by the first lens 606A and is directed towards the first 631 and second 632 slabs. The first lens 606A and the block 606B together form a temperature-variable beam splitter 606. At a low temperature $T_0$, the block 606B is contracted as shown in FIG. 6B, so that the input optical beam 204 propagates entirely in the second slab 632, as shown in FIG. 6B. At a higher temperature $T>T_0$, the block 606B expands, pushing the first slab 631 into the input optical beam 204, thereby causing the input optical beam 204 to propagate partially in the first slab 631 as the first sub-beam 211 and partially in the second slab 632 as the second sub-beam 212, as shown in FIG. 6C. The second lens 608 effectively functions as a beam combiner, recombining the first 211 and second 212 sub-beams into the recombined optical beam 210.

Due to the length L of the block 606B being dependent on the temperature T, when the temperature T changes, the block 606B moves the first 631 and second 632 slabs across the input optical beam 204, changing the power splitting ratio r(T) of the first 211 and second 212 sub-beams. The changing power splitting ratio r(T) causes the amplitude of the wavelength dependence of the efficiency of recombining the recombined optical beam 210 to vary according to Eq. (1); as a result, the thermal dependence of gain of the optical amplifier, optically coupled in series with the apparatus 600, is lessened; or more generally, the dependence of a spectral characteristic of an optical device serially coupled to the apparatus 600, is lessened.

The tuning element, e.g. the block 606B, may be passive, that is, not requiring electrical power to operate. The tuning element may also be active, e.g. extending or contracting in response to a control signal generated depending on some measured physical parameter, such as ambient temperature. The active control may provide a greater flexibility. Lenses 606A and 608 are optional and may be replaced by other optical elements for re-focusing optical beams between the input 641 and output 642 optical fibers, or may be omitted for free space propagating collimated optical beams.

Figure 7:
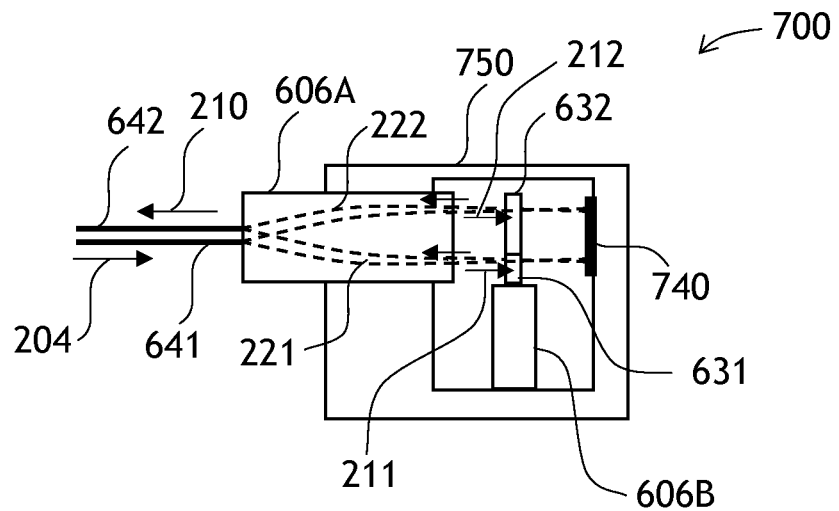
FIG. 7 is a plan view of a reflective apparatus of the disclosure.

Referring now to FIG. 7, an apparatus 700 is a reflective variant of the apparatus 600 of FIG. 6. The apparatus 700 of FIG. 7 includes a mirror 740 disposed in the first 221 and second 222 optical paths, for reflecting the first 211 and second 212 sub-beams to propagate back through the respective first 221 and second 222 optical paths. The first lens 606A disposed in a housing 750 has a triple function: first, as a collimator of the input optical beam 204; second, as a part of the variable beam splitter 606 (FIG. 6); and third, as a beam combiner for coupling the recombined beam 210 into the output optical fiber 642. One advantage of the apparatus 700 of FIG. 7 is compactness. The input 641 and output 642 optical fibers of the apparatus 700 are disposed on a same end of the housing 750, which may be beneficial for fiber routing purposes.

Figure 8:
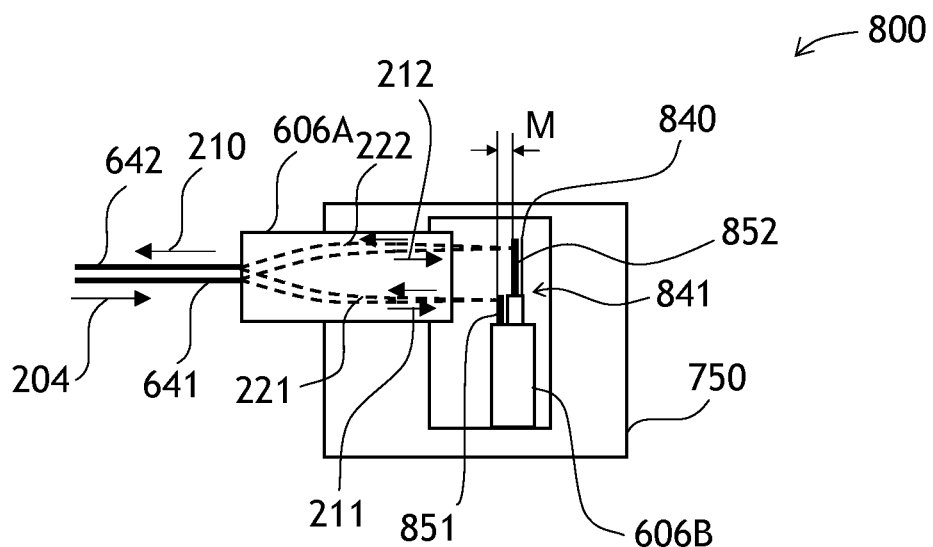
FIG. 8 is a plan view of a reflective apparatus of the disclosure having a stepped mirror.

Turning to FIG. 8, an apparatus 800 is a reflective embodiment of the apparatus 200 of FIG. 2, and is similar to the apparatus 700 of FIG. 7. One distinctive feature of the apparatus 800 of FIG. 8 is that the first slab 631, the second slab 632, and the mirror 740 are omitted. Instead, a stepped mirror 840 is disposed in the first 221 and second 222 optical paths. In operation, the stepped mirror reflects the first 211 and second 212 sub-beams to propagate back through the first 221 and second optical paths 222, respectively. The stepped mirror 840 has a step 841 having a top portion 851 and a bottom portion 852 for reflecting the first 211 and second 212 sub-beams respectively. In this embodiment, the optical path length difference OPD is proportional to a magnitude M of the step 841. In air, the optical path length difference OPD is approximately equal to 2M.

Figure 9:
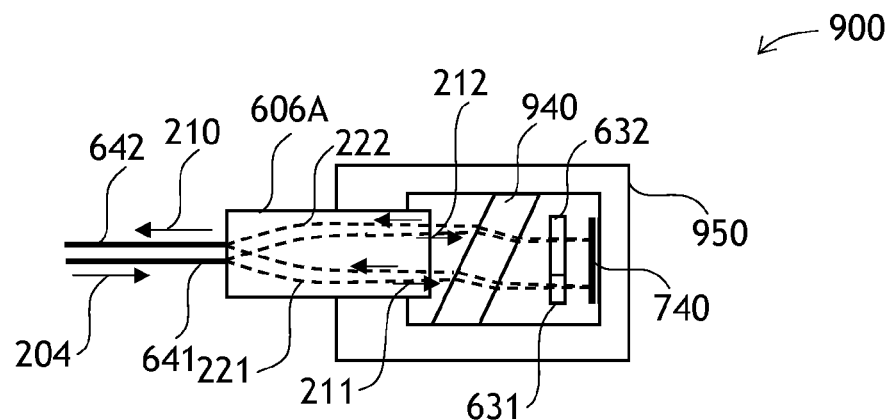
FIG. 9 is a plan view of a reflective apparatus of the disclosure having a thermally tuned slab of a transparent material.

Referring to FIG. 9, an apparatus 900 is another reflective embodiment of the apparatus 200 of FIG. 2, and is similar to the apparatus 700 of FIG. 7. The apparatus 900 of FIG. 9 includes a passive tuning element 940 affixed within a package 950. The tuning slab 940 has the refractive index dependent on the temperature, and is shaped and disposed such that when the temperature changes, the input optical beam 204 moves across the first 631 and the second 632 slabs, thereby changing the power splitting ratio of the input optical beam 204 into the first 211 and second 212 sub-beams. In the embodiment shown in FIG. 9, the tuning slab 940 has a plano-parallel shape, and is disposed at an acute angle to the input optical beam 204. Other shapes of the tuning slab 940 are possible, e.g. a prismatic shape. Furthermore, just like in the apparatus 700 of FIG. 7, the first 631 and the second 632 slabs may be replaced with a single transparent plate, film, or slab, so that in operation, only one of the first and second sub-beams propagates in the single plate, film, or slab.

Figure 10:
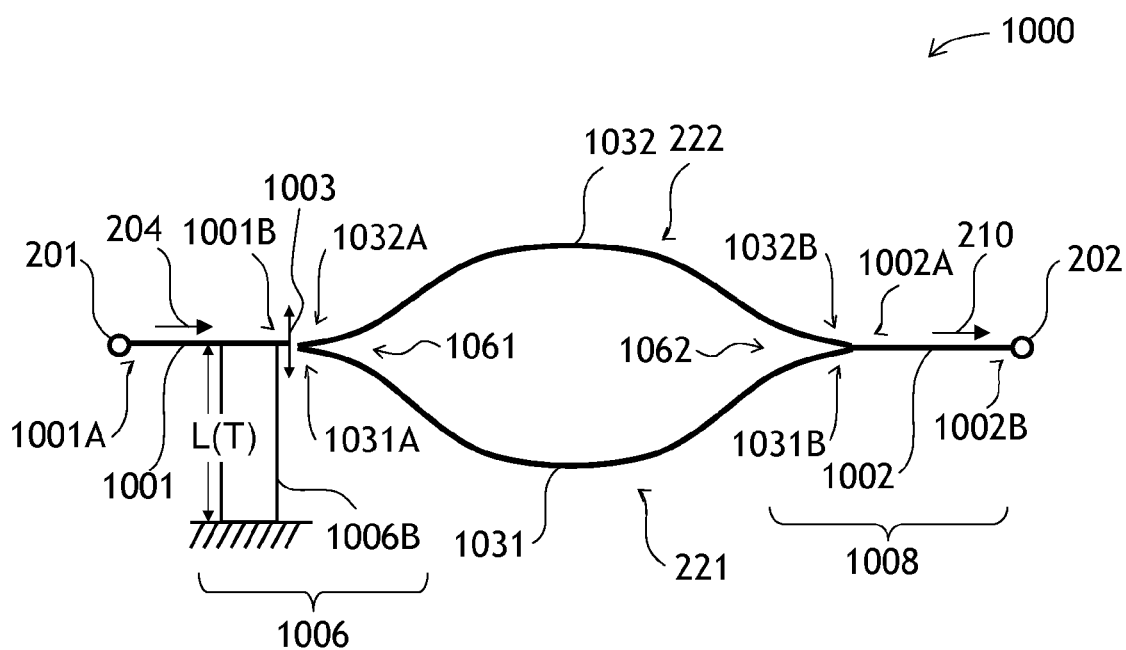
FIG. 10 is a plan view of a waveguide embodiment of an apparatus of the disclosure having a movable input waveguide.

Turning now to FIG. 10, an apparatus 1000 is a waveguide embodiment of the apparatus 200 of FIG. 2. In the apparatus 1000 of FIG. 10, the first 221 and second 222 optical paths are defined by first 1031 and second 1032 optical waveguides, respectively. The first 1031 and second 1032 optical waveguides have different lengths between their respective first 1031A, 1032A and second 1031B, 1032B opposed ends. A variable beam splitter 1006 of the apparatus 1000 includes an input waveguide 1001 having opposed first 1001A and second 1001B ends. The input waveguide 1001 is coupled at its first end 1001A to the input port 201. At its second end 1001B, the input waveguide 1001 forms a first Y-coupler 1061 with the first ends 1031A, 1032A of the first 1031 and second 1032 optical waveguides, respectively.

The second end 1001B of the input waveguide 1001 is supported by a block 1006B having a length L dependent on the temperature T and disposed such that when the temperature T changes, the second end 1001B of the input waveguide 1001 moves along an arrow 1003 with respect to the first ends 1031A, 1032A of the first 1031 and second 1032 optical waveguides, thereby changing the power splitting ratio.

A beam combiner 1008 includes an output optical waveguide 1002 having opposed first 1002A and second 1002B ends. The output waveguide 1002 forms at its first end 1002A a second Y-coupler 1062 with the second ends 1031B, 1032B of the first 1031 and second 1032 optical waveguides. The output optical waveguide 1002 is coupled at its second end 1002B to the output port 202.

Figure 11:
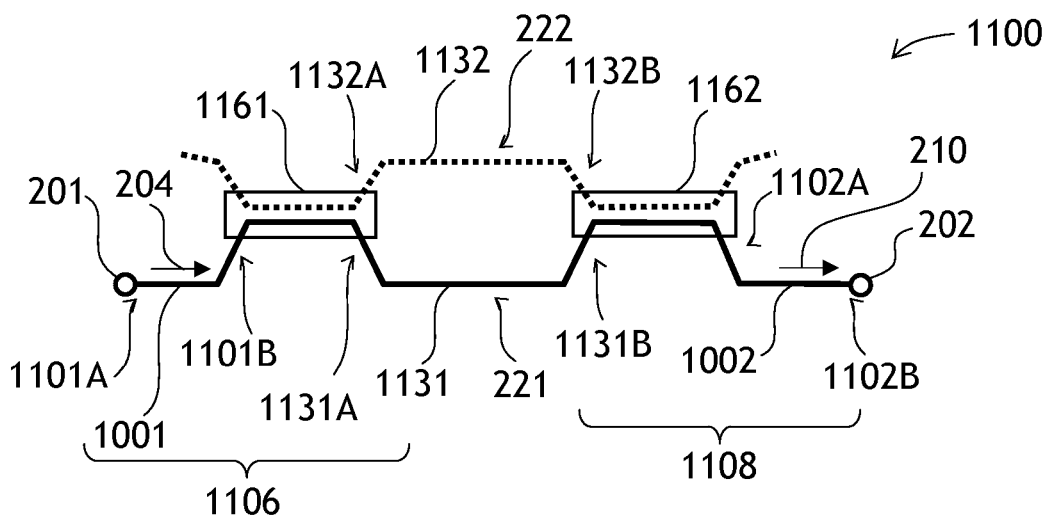
FIG. 11 is a plan view of a polymer waveguide embodiment of an apparatus of the disclosure.

Turning to FIG. 11, an apparatus 1100 is a polymer waveguide embodiment of the apparatus 200 of FIG. 2. In the apparatus 1100 of FIG. 11, the first 221 and second 222 optical paths are defined by first 1131 and second 1132 optical polymer waveguides, respectively. The first 1131 and second 1132 optical polymer waveguides have different lengths between their respective first 1131A, 1132A and second 1131B, 1132B opposed ends. A variable beam splitter 1106 of the apparatus 1100 comprises an input optical polymer waveguide 1101 having opposed first 1101A and second 1101B ends. The input polymer optical waveguide 1101 is coupled at its first end 1101A to the input port 201. At its second end 1101B, the input optical polymer waveguide 1101 forms a first coupler 1161 with the first ends 1131A, 1132A of the first 1131 and second 1132 optical polymer waveguides, respectively. An optical coupling ratio of the first coupler 1161 depends on the temperature due to a temperature dependence of the polymer's refractive index. Due to this temperature dependence, the power splitting ratio of the variable beam splitter 1161 depends on the temperature.

A beam combiner 1108 of the apparatus 1100 includes an output optical polymer waveguide 1102 having opposed first 1102A and second 1102B ends. The output optical polymer waveguide 1102 forms at its first end 1102A a second coupler 1162 with the second ends 1131B, 1132B of the first 1131 and second 1132 optical waveguides. The output optical polymer waveguide 1102 coupled at its second end 1102B to the output port 202.

Figure 12:
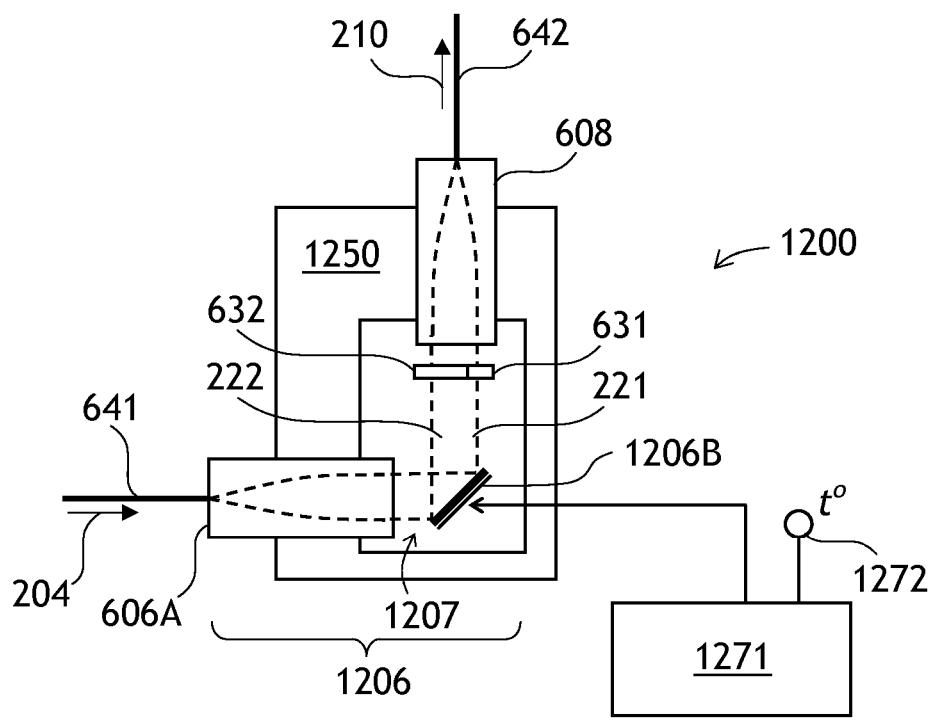
FIG. 12 is a plan view of an apparatus of the disclosure, having a tiltable micro-electro-mechanical system (MEMS) mirror.

Referring now to FIG. 12, an apparatus 1200 is an "active" embodiment of the apparatus 200 of FIG. 2. The apparatus 1200 of FIG. 12 includes the input 641 and output 642 optical fibers coupled to the first 606A and second 608 lenses, respectively, affixed within a body 1250. The first 221 and second 222 optical paths of the apparatus 1200 of FIG. 12 include the first 631 and second 632 slabs of optically transparent material, respectively, disposed partially in the input optical beam 204 collimated by a first lens 606A.

An active tuning element 1206 includes the first lens 606A and a tiltable micro-electro-mechanical system (MEMS) mirror 1206B disposed in an optical path 1207 between the first lens 606A and the first 631 and second 632 slabs and configured to reflect the input optical beam 204 towards the first 631 and second 632 slabs. A controller 1271 is operationally coupled to the MEMS mirror 1206B and is configured to change an angle of tilt of the MEMS mirror 1206B upon change of the temperature detected by a temperature sensor 1272 coupled to the controller 1271, thereby changing the power splitting ratio of the first 211 and second 212 sub-beams, which are combined by the second lens 608. It is also possible that the second slab 632 is omitted entirely. For this case, only the first sub-beam 211 propagates in the singular first slab, plate, or film 631, and the second sub-beam 212 propagates in air proximate the first slab, plate, or film 631. The second lens 608 then recombines the first 211 and second 212 sub-beams in the output optical fiber 642, for example a multimode optical fiber for receiving the recombined optical beam 210, which may shift upon tilting of the MEMS mirror 1206B.

Referring back to FIG. 6A with further reference to FIG. 12, an "active" embodiment of the apparatus 600 may include a linear translator in place of the block 606B. The linear translator may be energized by a control signal provided by the controller 1271 (FIG. 12). In operation, the linear translator may move the first 631 and second 632 slabs across the input optical beam 204 in dependence on the control signal, which may be generated by the controller 1271 in response to some physical parameter, for example a measured temperature, thereby changing the power splitting ratio.

Figure 13:
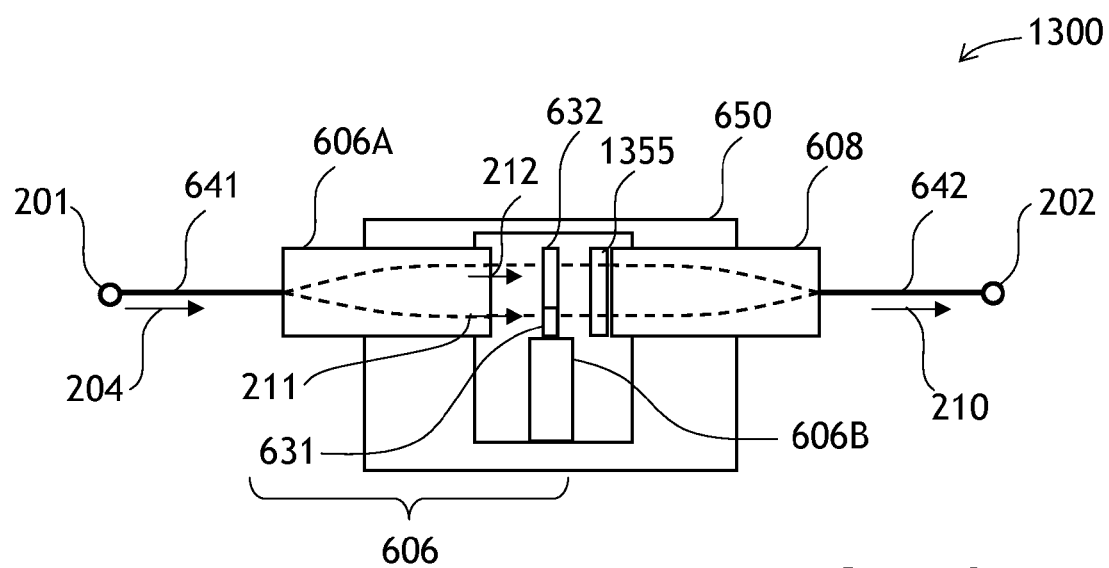
FIG. 13 is a plan view of an embodiment of the disclosure including a GFF.

Turning to FIG. 13, an apparatus 1300 is a preferred embodiment of the apparatus 600 of FIG. 6. The apparatus 1300 further includes a gain flattening optical filter (GFF) 1355 for flattening a gain profile of an optical amplifier, not shown. Although the GFF 1355 is shown attached to the second lens 608, it may be disposed anywhere in an optical path between the input 201 and output 202 optical ports. The GFF 1355 may also be disposed in an optical path of the reflective embodiments 700 of FIG. 7, 800 of FIG. 8, and 900 of FIG. 9 of the apparatus 200 of FIG. 2.

Figure 14A:
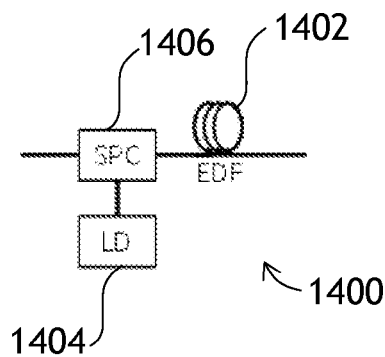
FIG. 14A is a schematic view of a single-stage EDFA.
Figure 14B:
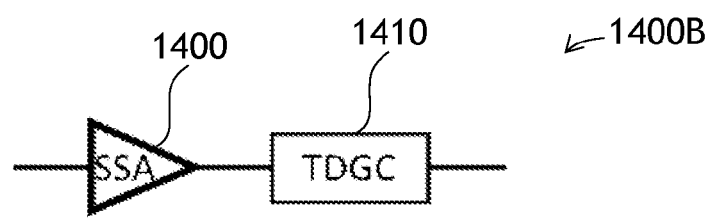
FIG. 14B is a schematic view of the single-stage EDFA of FIG. 14A coupled to an apparatus of the disclosure.

Referring to FIGS. 14A to 14E, a typical placement of the apparatuses 200, 600, 700, 800, 900, 1000, 1100, 1200, and 1300 of FIGS. 2, 6A, 7, 8, 9, 10, 11, 12, and 13, respectively, in various optical amplifier systems is illustrated. Referring first to FIG. 14A, a single stage optical amplifier (SSA) 1400 typically includes an EDF spool 1402 a pump laser diode 1404 coupled to the EDF spool 1402 by a pump coupler 1406. Turning to FIG. 14B, an optical amplifying module 1400B includes a "temperature dependent gain compensator" (TDGC) 1410 serially optically coupled to the SSA 1400. Variants of the TDGC 1410 shown in FIGS. 14B to 14E include, without limitation, the apparatus embodiments 200, 600, 700, 800, 900, 1000, 1100, 1200, and 1300 of FIGS. 2, 6A, 7, 8, 9, 10, 11, 12, and 13, respectively.

Figure 14C:
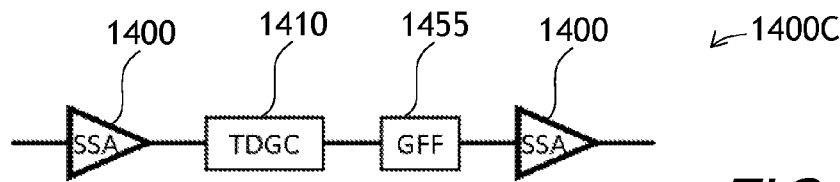
FIG. 14C is a schematic view of a dual-stage EDFA coupled to an apparatus of the disclosure.
Figure 14D:
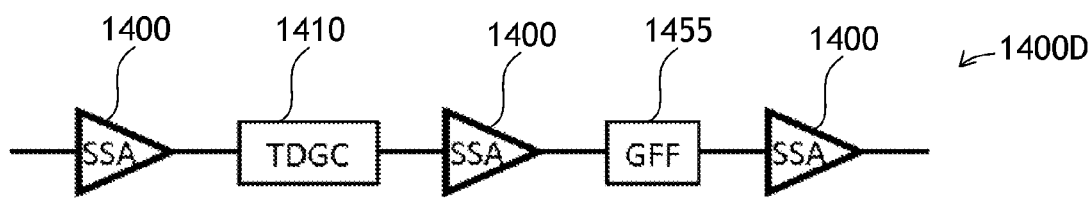
FIGS. 14D and 14E are schematic views of a triple-stage EDFA coupled to an apparatus of the disclosure.
Figure 14E:
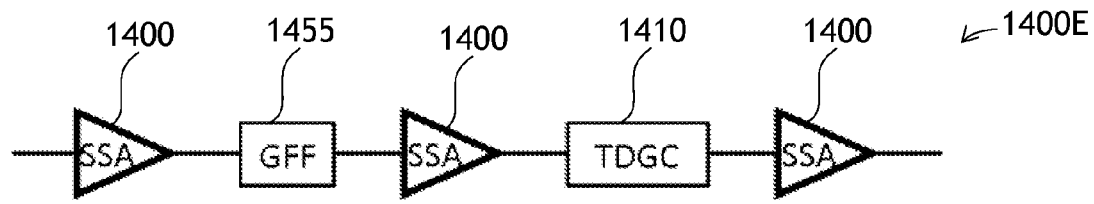

Referring to FIG. 14C, an optical amplifier module 1400C includes two SSA 1400, one TDGC 1410, and an external GFF 1455 connected in series between the two SSA 1400. Turning to FIG. 14D, an optical amplifier module 1400D includes three SSA 1400, one TDGC 1410, and one external GFF 1455 connected in series. The positions of the TDGC 1410 and the GFF 1455 may be reversed as shown in an optical amplifier module 1400E of FIG. 14E.

Figure 15A:
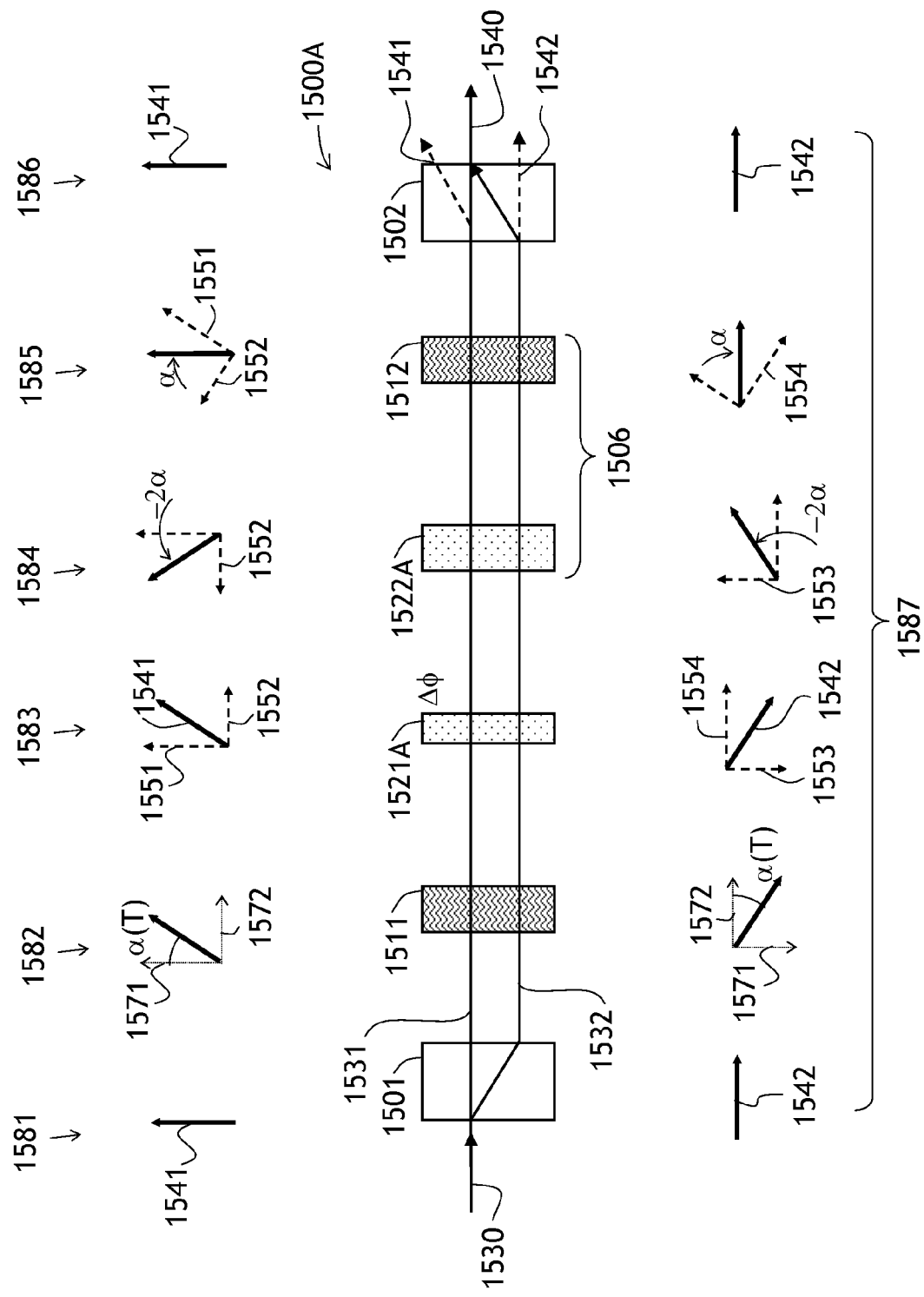
FIGS. 15A, 15B, and 15C are schematic side cross-sectional views of polarization-based embodiments of an apparatus of the disclosure.

Polarization embodiments of an apparatus of the disclosure will now be considered. Referring to FIG. 15A, an apparatus 1500A includes a first walk-off crystal 1501 having a polarization axis oriented in an X-direction 1571 shown at 1582, for polarizing an input optical beam 1530 to obtain a first optical beam 1531 having a polarization 1541 shown at 1581. The polarization 1541 is oriented in the X-direction 1571, and a second optical beam 1532, shifted downwards (FIG. 15A) by the first walk-off crystal 1501 with respect to the first optical beam 1531 and having a polarization 1542 oriented in a Y-direction 1572 perpendicular to the X-direction 1571. The first 1531 and second 1532 optical beams undergo similar polarization transformations, so only the first optical beam 1531 will be considered for brevity.

A first polarization rotator 1511, for example a Faraday rotator, may be optically coupled to the first walk-off crystal 1501 and configured for rotating the polarization 1541 of the first optical beam 1531 away from the X-direction 1571 by a first angle α, 1582. In this example, the rotation is in clockwise direction when looking towards the first optical beam 1531, that is, right to left in FIG. 15A. The first angle α has a pre-defined dependence on ambient temperature T, such that the polarized optical beam 1531 comprises an X-polarization component 1551 oriented in the X direction 1571, and a Y-polarization component 1552 oriented in a Y-direction 1572 perpendicular to the X-direction 1571, as shown at 1583.

A first waveplate 1521A may be optically coupled to the first polarization rotator 1511. The first waveplate 1521A may have an optical axis oriented substantially in the X-direction 1571 or the Y-direction 1572. The function of the first waveplate 1521A is to impart a non-zero phase shift $\Delta\phi$ between the X polarization component 1551 and the Y-polarization component 1552 of the first optical beam 1531. Thus, the first waveplate 1521A has a similar function as first 231 and second 232 slabs in the apparatus 200 of FIG. 2, that is, to create an optical path length difference (OPD).

A second polarization rotator 1506 (FIG. 15A) may be optically coupled to the first waveplate 1521. In the embodiment shown in FIG. 15A, the second polarization rotator 1506 includes a half-wave waveplate 1522A and a Faraday element 1512. The half-wave waveplate 1522A has an optical axis oriented substantially in the X-direction 1571 or the Y-direction 1572. The function of the half-wave waveplate 1522A is to rotate the polarization 1541 back (counterclockwise at 1584 in FIG. 15A) by the double first angle 2α, that is, to "reflect" the polarization 1541 about the X-direction 1571. The function of the Faraday element 1512 is to rotate the polarization 1541 forward (clockwise at 1585 in FIG. 15A) by the first angle α. Together, the half-wave waveplate 1522A and the Faraday element 1512 rotate the polarization 1541 backward by the first angle α back to become oriented in the X-direction 1571, as shown at 1585. One advantage of such a configuration is that the first polarization rotator 1511 and the Faraday element 1512 may include a same type Faraday element with substantially the same dependence of the first angle α of rotation on the temperature T. This configuration ensures that the first optical beam 1531, which may be elliptically polarized due to the non-zero phase shift $\Delta\phi$ imparted by the first waveplate 1521A, has a polarization axis extending along the X-direction 1571 after propagating through the second polarization rotator 1506, at any temperature T within a pre-defined operating range.

A second walk-off crystal 1502 may be optically coupled to the second polarization rotator 1506. The second walk-off crystal 1502 may have a polarization axis oriented in the X-direction 1571 for polarizing the first optical beam 1531 to obtain an output optical beam 1540.

The apparatus 1500A operates as follows. The non-zero phase shift Δφ between the X-polarization component 1551 and Y-polarization component 1552 of the first optical beam 1531, imparted by the first waveplate 1521A, causes the first optical beam 1531 to have a polarization state dependent on wavelength, via the phase shift Δφ depending on the wavelength at a constant retardation (optical path length difference) between the X-polarized 1571 and Y-polarized 1572 components of the first optical beam 1531, and on temperature T, due to the dependence of the first angle α temperature T. After propagating through the second walk-off crystal 1502, a portion 1541 of the first optical beam 1531 is redirected away from the optical path, as shown in FIG. 15A. As a result, a coupling efficiency of the first optical beam 1531 into the output optical beam 1540 has a wavelength dependence. An amplitude of this wavelength dependence is dependent on the first angle α and thereby has a pre-defined dependence on the temperature T. Since the wavelength dependence results from two-beam interference, that is, the interference of the X-polarized component 1551 and the Y-polarized component 1552, the resulting transmission function will be identical to the transmission function 400 of FIG. 4, which is described by Eq. (1), in which the parameter 2π·OPD/λ corresponds to the phase shift Δφ. The function r(T) may be different. For instance, in the case of linear dependence of the first angle α(T) of the polarization rotation, the function r(T) has a dependence represented by $\cos^2(T/T_0)$, where $T_0$ is a constant, herein referred to as "reference temperature".

The second optical beam 1532 undergoes similar polarization transformations, as generally shown at 1587. Specifically, the first waveplate 1521A imparts the phase shift Δφ between an X-polarization component 1553 and a Y-polarization component 1553 of the second optical beam 1532. As a result, a portion 1542 of the second optical beam 1532 is rejected by the second polarizer 1502. Accordingly, the second optical beam 152 will be similarly attenuated, with a similar wavelength and temperature dependence of the throughput. Therefore, the output optical beam 1540 will be attenuated with a wavelength and temperature dependence, the attenuation of the input optical beam 1530 being substantially independent of the degree of polarization of the input optical beam 1530.

Figure 15B:
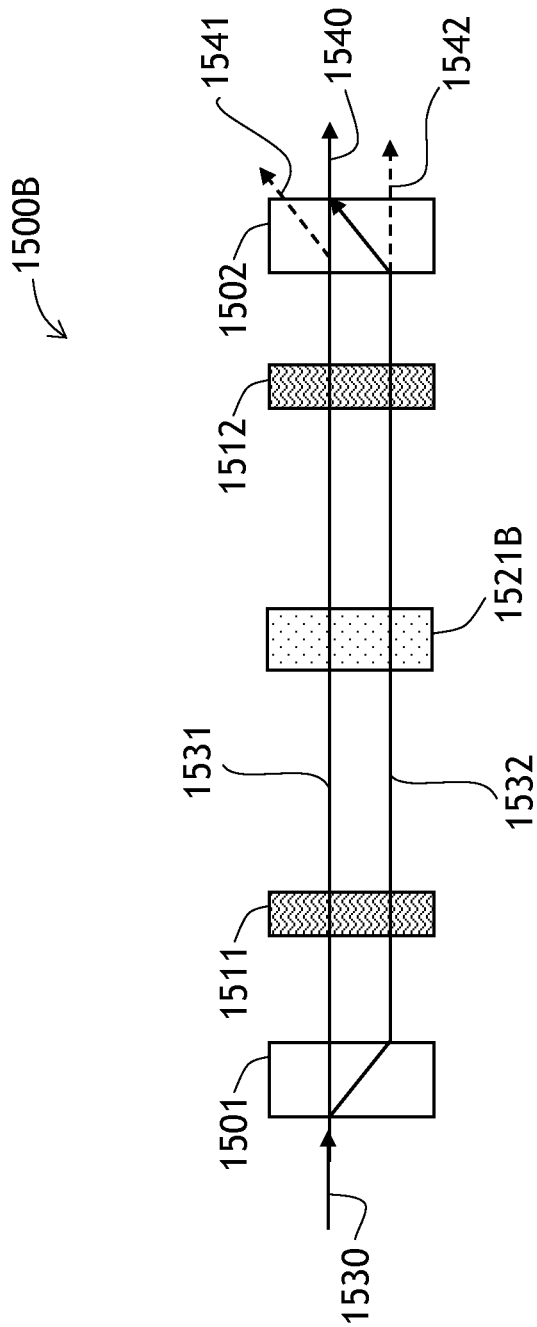

Referring to FIG. 15B with further reference to FIG. 15A, an apparatus 1500B of FIG. 15B is an embodiment of the an apparatus 1500A of FIG. 15A. In the apparatus 1500B of FIG. 15B, the first waveplate 1521A and the half-wave waveplate 1522A are combined into a single waveplate 1521B having the combined optical retardation of the first waveplate 1521A (i.e. the phase shift Δφ) and the half-wave waveplate 1522A (i.e. λ/2).

Figure 15C:
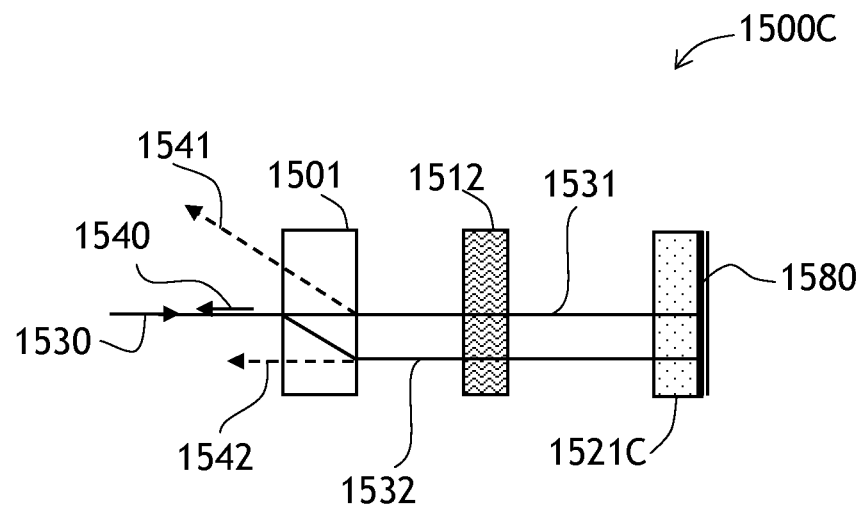

Turning to FIG. 15C with further reference to FIG. 15B, an apparatus 1500C is a reflective embodiment of the apparatus 1500B of FIG. 15B. The apparatus 1500C of FIG. 15C includes a reflector 1580 optically coupled to a waveplate 1521C, for reflecting the first optical beam 1531 and the second optical beam 1532 back to the first polarization rotator 1511 through the waveplate 1521C. Thus, the waveplate 1521C operates in double pass and, accordingly, has one half of the optical retardation of the single waveplate 1521B of FIG. 15B. In the apparatus 1500C of FIG. 15C, the first polarization rotator 1511 and the Faraday element 1506 are replaced with a same polarization rotator, for example the Faraday element 1512. Similarly, the first 1501 and second 1502 polarizers may include a same walk-off birefringent crystal, for example the first birefringent crystal 1501.

Many modifications of the apparatuses 1500A-1500C of FIGS. 15A-15C are possible. For example, the walk-off crystals 1501 and 1502 may be replaced with polarization beam splitters, or other type polarizers known to a person skilled in the art. The first 1511 and second 1506 polarization rotators may include Faraday elements, specially tuned or formulated to provide a required thermal coefficient of polarization rotation, for example at least 0.25 degrees 1° C.

Figure 16A:
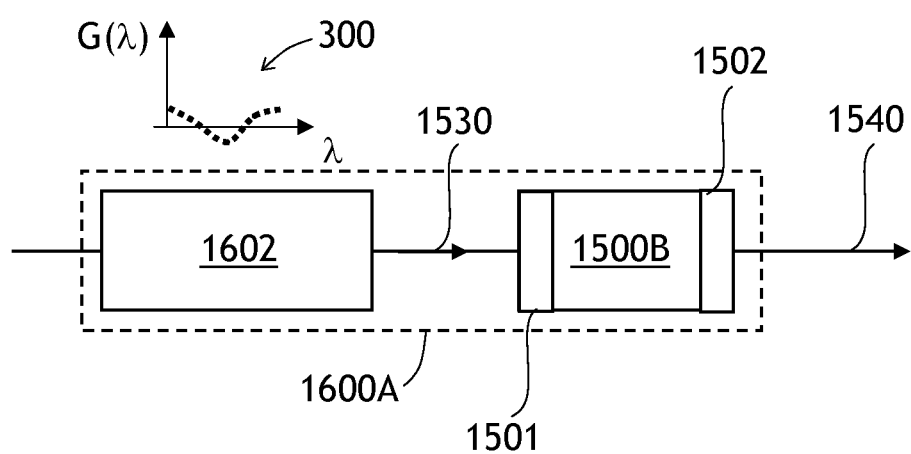
FIG. 16A is a schematic view of an apparatus of FIGS. 15A-15C including an optical amplifier.

The optical apparatuses 1500A-1500C of FIGS. 15A-15C, respectively, may be used to lessen or compensate thermal effects in an optical amplifier, similarly to the apparatus 200 of FIG. 2. Referring now to FIG. 16A with further reference to FIG. 15B, an amplifier apparatus 1600A includes an optical amplifier 1602 and the apparatus 1500B of FIG. 15B optically coupled to the optical amplifier 1602, more specifically to the first polarizer 1501 of the apparatus 1500B of FIG. 15B, for providing the input optical beam 1530.

The optical amplifier 1602 may have the spectral gain profile 300 (FIG. 3B) denoted in FIG. 16A as G(λ). As explained above with reference to FIG. 3B, the spectral gain profile 300 varies with temperature. To lessen the dependence of the spectral gain profile 300 on the temperature, the optical retardation of the waveplate 1521B and the dependence of the first angle α of rotation on the temperature T may be selected to counteract, or lessen, the spectral gain profile 300 thermal dependence. The apparatuses 1500A of FIG. 15A and 1500C of FIG. 15C may also be used to lessen the spectral gain profile 300 thermal dependence. In a similar manner, the apparatus 200 of FIG. 2, 600 of FIG. 6A, 700 of FIG. 7, 800 of FIG. 8, 900 of FIG. 9, 1000 of FIG. 10, 1100 of FIG. 11, 1200 of FIG. 12, 1300 of FIG. 13 may be used in place of the apparatus 1500B. Of course, the thermal gain variation compensation described herein is not limited to EDFA only. Thermal variations in other types of amplifiers may also be lessened, in particular when these thermal variations may be at least approximately represented by a bell-shaped spectral profile having an amplitude varying with temperature.

Figure 16B:
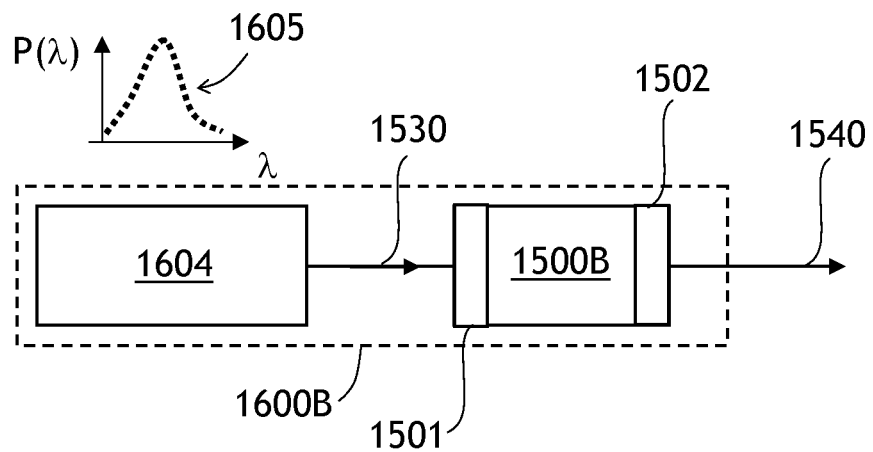
FIG. 16B is a schematic view of an apparatus of FIGS. 15A-15C including a light source.

Referring to FIG. 16B with further reference to FIG. 15B, a light source apparatus 1600B includes a light source 1604 and the apparatus 1500B of FIG. 15B coupled to the light source 1604. For example, the light source 1604 may be directly optically coupled to the first polarizer 1501 of the apparatus 1500B of FIG. 15B, for providing the input optical beam 1530.

The light source 1604 may have a thermal dependence of a spectral characteristic 1605 denoted in FIG. 16B as P(λ). The optical retardation of the waveplate 1521B and the dependence of the first angle α of rotation on the temperature T may be selected to counteract, or lessen, the spectral characteristic P(λ) 1605 thermal dependence, for example by using Eq. (1) above with the OPD=2πλ/Δφ.

The apparatus 1500B of FIG. 15B may be replaced with the apparatuses 1500A of FIG. 15A and 1500C of FIG. 15C, as well as by the apparatus 200 of FIG. 2, 600 of FIG. 6A, 700 of FIG. 7, 800 of FIG. 8, 900 of FIG. 9, 1000 of FIG. 10, 1100 of FIG. 11, 1200 of FIG. 12, 1300 of FIG. 13. The apparatuses 200, 600, 700, 800, 900, 1000, 1100, 1200, and 1300 may operate similarly, in that the amplitude of the wavelength dependence of transmission of these apparatuses is dependent on the power splitting ratio r(T) and thereby has a dependence on the temperature T, so that in operation, the dependence of the spectral characteristic P(λ) 1605 on the temperature T is lessened.

Figure 17:
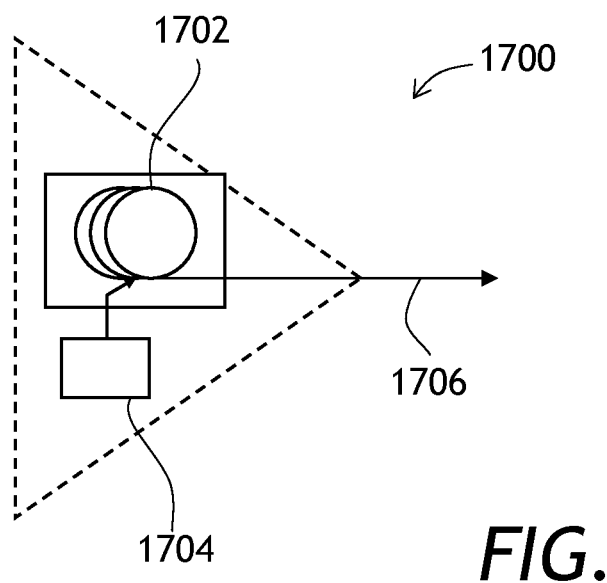
FIG. 17 is a block diagram of an ASE source.

In one embodiment, the light source apparatus 1600B may include a source of amplified spontaneous emission (ASE). Turning to FIG. 17, an ASE source 1700 includes an active optical fiber 1702 and a pump source 1704 coupled to the active optical fiber 1702 for generating ASE 1706 in the active optical fiber 1702. The ASE 1706 may form the optical beam 1530 for coupling to the first walk-off crystal 1501 of the apparatuses 1500A-1500C of FIGS. 15A-15C, respectively. The dependence of the first angle α of rotation on the temperature T is selected to counteract, or lessen, the thermal dependence of a spectral characteristic of the ASE source 1700. The apparatuses 200 of FIG. 2, 600 of FIG. 6A, 700 of FIG. 7, 800 of FIG. 8, 900 of FIG. 9, 1000 of FIG. 10, 1100 of FIG. 11, 1200 of FIG. 12, 1300 of FIG. 13 may also be used for this purpose. Any gain medium capable of generating ASE might be used in the ASE source 1700.

Figure 18:
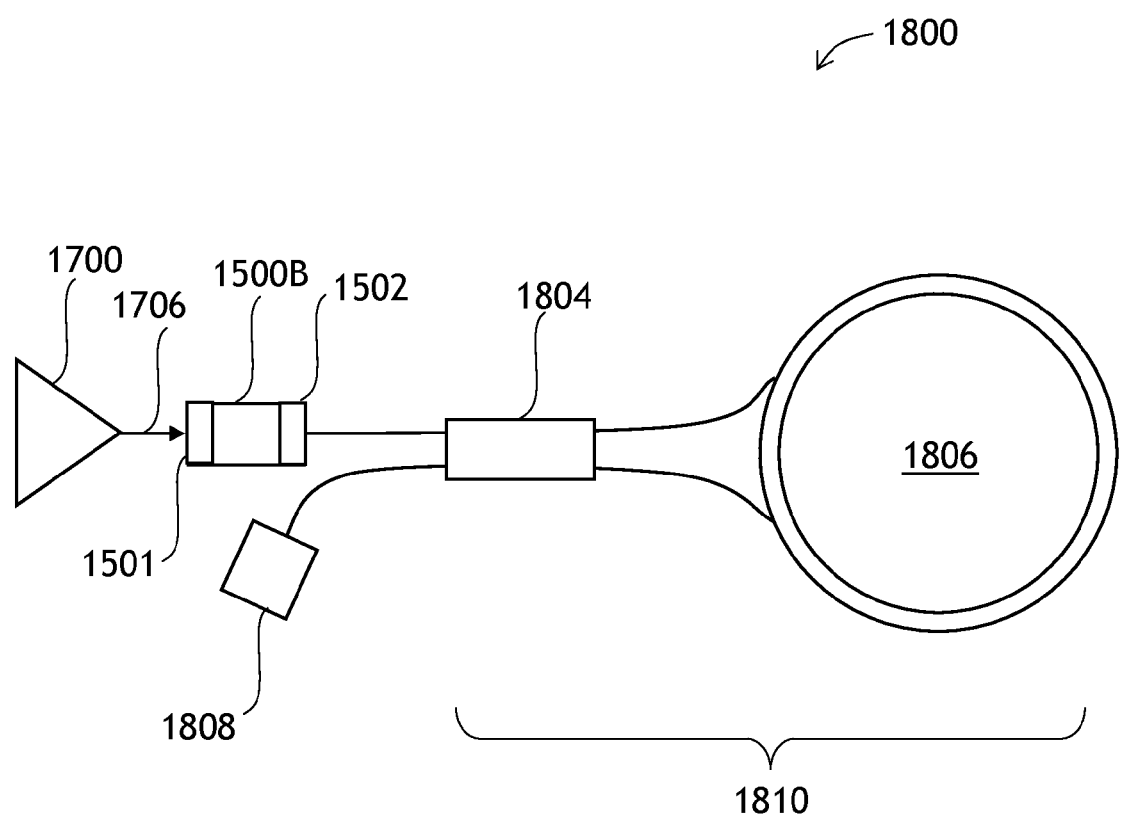
FIG. 18 is a schematic view of a gyroscope using an apparatus of FIGS. 2, 6A-6C, 7-13, and FIGS. 15A-15C.

Referring to FIG. 18, an optical gyroscope 1800 of the present disclosure may include the ASE source 1700 (FIG. 7), optically coupled to the first walk-off crystal 1501 of the apparatus 1500B, a fiber spool 1806 optically coupled to a 2×2 optical coupler 1804, and a photodetector 1808 optically coupled to the 2×2 optical coupler 1804 opposite the fiber spool 1806. Together, the 2×2 optical coupler 1804 and the fiber spool 1806 form a Sagnac interferometer 1810. In operation, the ASE 1706 propagates through the apparatus 1500B and is coupled via the 2×2 optical coupler 1804 into the fiber spool 1806 to propagate both clockwise and counterclockwise. When the fiber spool 1806 does not rotate, the phase difference of the clockwise and counterclockwise propagating light beams is zero. When the fiber spool 1806 does rotate, the phase difference becomes proportional to the angular velocity; the phase difference results in light being detected by the photodetector 1808. Just like in the light source apparatus 1600B of FIG. 16B, the function of the apparatus 1500B is to lessen a thermal variation of a spectral characteristic of the ASE 1706. The apparatuses 200 of FIG. 2, 600 of FIG. 6A, 700 of FIG. 7, 800 of FIG. 8, 900 of FIG. 9, 1000 of FIG. 10, 1100 of FIG. 11, 1200 of FIG. 12, 1300 of FIG. 13 may also be used for this purpose.

Figure 19:
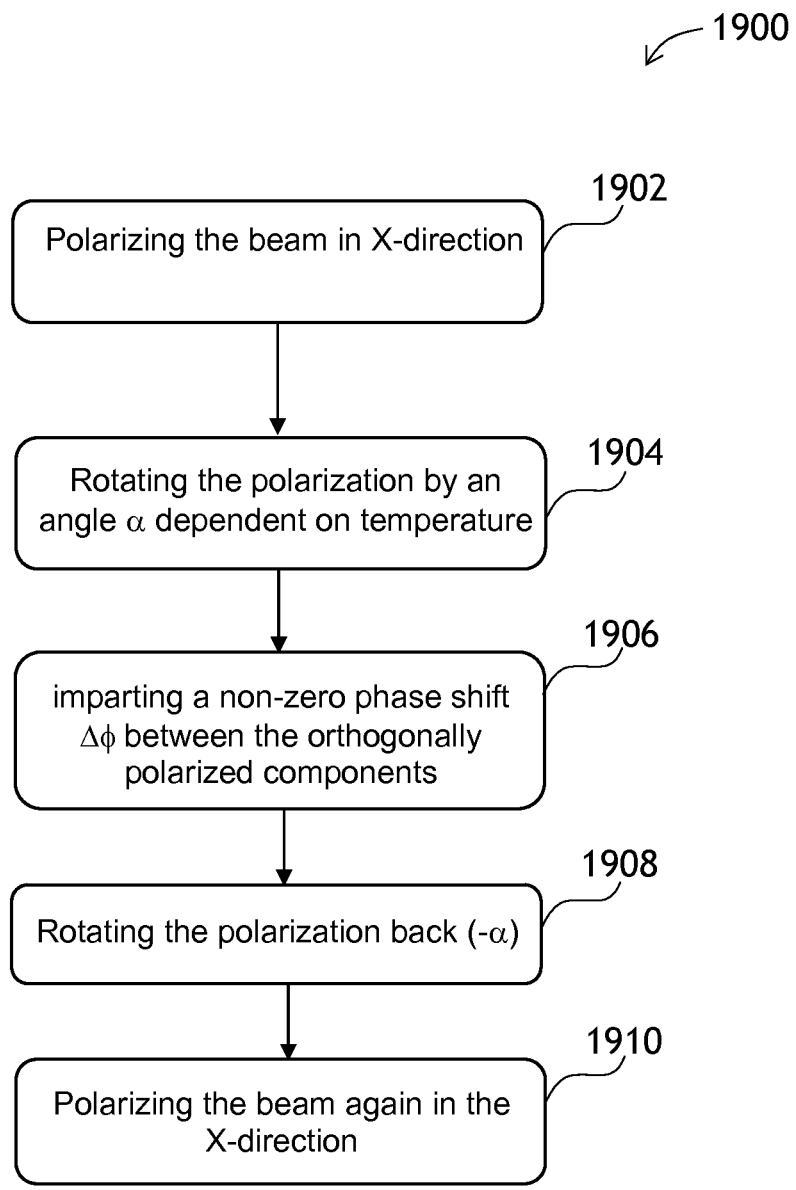
FIG. 19 is a flow chart of a method for lessening a dependence of a spectral characteristic of an optical amplifier or light source on temperature.

Turning to FIG. 19, a method 1900 for lessening a dependence of a spectral characteristic of a light source, for example the spectral characteristic P(λ) of the light source 1700 of FIG. 17, on temperature may include a step 1902 (FIG. 19) of polarizing in the X-direction 1571 (FIG. 15A) the optical beam (for example, the ASE 1706) emitted by the light source, so as to obtain the first optical beam 1531 having the polarization oriented in the X-direction 1571. In a next step 1904, the polarization 1541 of the first optical beam 1531 is rotated away from the X-direction 1571 by the first angle α dependent on the temperature T, such that the first optical beam 1531 includes two polarization components: the X-polarization component 1551 oriented in the X direction 1571, and the Y-polarization component 1552 oriented in the Y-direction 1572. In a following step 1906, a non-zero phase shift Δφ is imparted between the X-polarization component 1571 and the Y-polarization component 1572 of the first optical beam 1531, by transmitting the first optical beam 1531 through the first waveplate 1521A, which has an optical axis oriented substantially in the X-direction 1571 or the Y-direction 1572.

In a following step 1908, the polarization 1541 of the first optical beam 1531 is rotated back to the X-direction 1571, that is, back by the first angle α. Then, in a step 1910, the first optical beam 1531 is polarized again in the X-direction 1571, to obtain the output optical beam 1540. As explained above with reference to FIG. 15A, the coupling efficiency of the first optical beam 1531 into the output optical beam 1540 has a wavelength dependence due to the non-zero phase shift Δφ between the X-polarization component 1551 and the Y-polarization component 1552 of the first optical beam 1531. As explained above with reference to FIG. 15A, the same method steps may apply to the second optical beam 1532 having the polarization 1542 oriented in the Y-direction 1572.

The amplitude of the wavelength dependence is dependent on the first angle α and thereby has a dependence on the temperature T, such that the dependence of the spectral characteristic P(λ) 1605 of the light source 1700 on the temperature T is lessened by the dependence of the amplitude on the temperature T. The non-zero phase shift Δφ and the thermal dependence of the first angle α are selected so that the thermal dependence of the spectral characteristic P(λ) of the light source 1700 of FIG. 17 is lessened by the dependence of the amplitude of the wavelength dependence, on the temperature T. For example, the first angle α may depend on the temperature T with a proportionality coefficient of at least 0.25 degrees 1° C.

The method 1900 may also be used for lessening a thermal dependence of a spectral gain profile G(λ) of an optical amplifier such as, for example, the optical amplifier 1602 of FIG. 16A. In this particular embodiment of the method 1900, the non-zero phase shift Δφ and the thermal dependence of the first angle α are selected so that the thermal dependence of the spectral gain profile G(λ) of the optical amplifier 1602 is lessened by the dependence of the amplitude of the wavelength dependence, such as the transmission function 400 (FIG. 4), on the temperature T.

Figure 20:
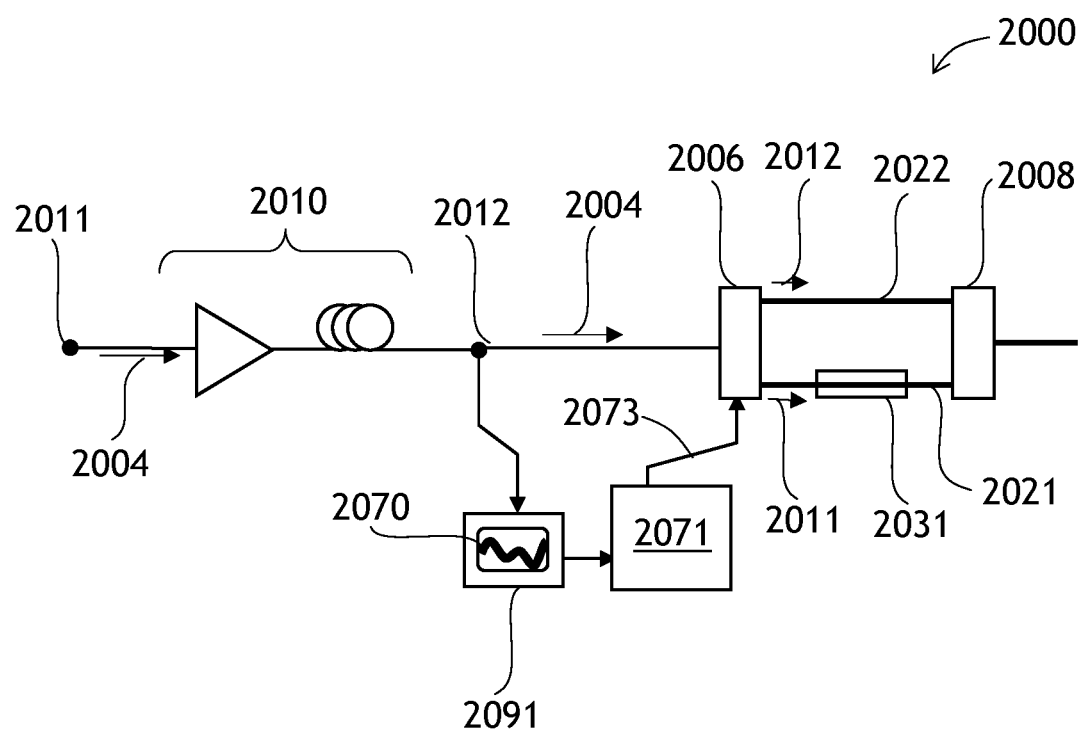
FIG. 20 is a schematic view of an apparatus of the disclosure for lessening a variation of a spectral characteristic of an optical device.

Referring now to FIG. 20, an apparatus 2000 of the present disclosure includes a Raman amplifier 2010 having a first port 2011 for inputting an optical beam 2004 for propagation through the Raman amplifier 2010, and a second port 2012 for outputting the optical beam 2004 amplified by the Raman amplifier 2010. The apparatus 2000 further includes a variable beam splitter 2006 optically coupled to the second port 2012 and configured for splitting the optical beam 2004 into a plurality of sub-beams including a first sub-beam 2011, a second sub-beam 2012, and optionally more sub-beams. In this embodiment, the variable beam splitter 2006 has a power splitting ratio dependent on a first control signal 2073. The variable beam splitter 2006 splits the optical beam 2004 to propagate along first 2021 and second 202 optical paths as a first 2011 and second 2012 sub-beams, respectively. The first 2021 and second 2022 optical paths have different optical path length. The optical path length difference may be provided by a block 2031 of a transparent material in the first optical path 2021. More than two optical paths 2021 and 2022 may be provided for the plurality of sub-beams, one per sub-beam.

A beam combiner 2008 is optically coupled to the first 2021 and second 2022 optical paths for combining the plurality of sub-beams including the first 2011 and second 2012 sub-beams propagated through the first 2021 and second 2022 optical paths, respectively, thereby recombining the optical beam 2004. Similarly to the apparatus 200 of FIG. 2, an efficiency of recombining the optical beam 2004 (FIG. 20) by the beam combiner 2008 is wavelength-dependent, due to the optical path length difference.

A controller 2071 may be provided. The controller 2071 is operationally coupled to the variable beam splitter 2006 for providing the first control signal 2073. In this way, an amplitude of the wavelength dependence of the recombining efficiency is dependent on the first control signal 2073 via the dependence on the power splitting ratio.

The Raman amplifier 2010 may have a time-varying spectral response due to thermal fluctuations, signal load variations, and other reasons. In accordance with the present disclosure, the controller 2071 may be configured to provide the first control signal 2073 to control the amplitude of the wavelength dependence so as to counter-act variation of the spectral response of the Raman amplifier 2010 with time. In this embodiment, the apparatus 2000 may further include an optical spectrum monitor 2091 optically coupled to the Raman amplifier 2010 for obtaining a time-varying optical spectrum 2070 of the optical beam 2004 outputted by the Raman amplifier 2010. The controller 2071 may be operationally coupled to the optical channel monitor 2091, and may be configured to receive the optical spectrum 2070 from the optical spectrum monitor 2091, and to provide the first control signal 2073 to lessen a variation of the received optical spectrum 2070 with time. More generally, any optical device having a time-varying spectral response may be used instead of the Raman amplifier 2010. The controller 2071 of the apparatus 2000 may be configured so as to lessen the variation of the spectral response of the optical device. The apparatus 2000 may also include not one but several sequentially coupled actively-controlled apparatuses 200 of FIG. 2, which may have different wavelength dependences of optical throughput. In this embodiment, the several actively-controlled apparatuses 200 may be operationally coupled to the controller 2071 to further lessen the variation of the spectral response of the optical device.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device for lessening a dependence of a spectral characteristic of a light source on temperature, comprising:
a first polarizer having a polarization axis oriented in an X-direction, for polarizing an input optical beam to obtain a first optical beam having a polarization oriented in the X-direction;
a first polarization rotator optically coupled to the first polarizer and configured for rotating the polarization of the first optical beam away from the X-direction by a first angle having a pre-defined dependence on temperature, such that the polarized optical beam comprises an X-polarization component oriented in the X direction, and a Y-polarization component oriented in a Y-direction perpendicular to the X-direction;
a first waveplate optically coupled to the first polarization rotator and having an optical axis oriented substantially in the X-direction or Y-direction, for imparting a non-zero phase shift between the X- and Y-polarization components of the first optical beam;
a second polarization rotator optically coupled to the first waveplate and configured for rotating the X-polarization component of the first optical beam by the first angle back to become oriented in the X-direction and having a substantially same pre-defined rotation angle dependence on temperature as the first Faraday rotator; and
a second polarizer optically coupled to the second polarization rotator having a polarization axis oriented in the X-direction, for polarizing the first optical beam to obtain an output optical beam;
wherein a coupling efficiency of the first optical beam into the output optical beam has a wavelength dependence due to the non-zero phase shift between the X- and Y-polarization components of the first optical beam;
wherein an amplitude of the wavelength dependence is dependent on the first angle and thereby has a pre-defined dependence on the temperature.

2. The apparatus of claim 1, wherein the first or second polarizers comprise a walk-off birefringent crystal.

3. The apparatus of claim 1, wherein the first and second polarization rotators comprise a Faraday element.

4. The apparatus of claim 3, wherein the first or second polarization rotators further comprise a half-wave waveplate having an optical axis oriented substantially in the X-direction or the Y-direction.

5. The apparatus of claim 3, wherein the first and second Faraday rotators have a thermal coefficient of polarization rotation of at least 0.25 degrees 1° C.

6. The apparatus of claim 1, further comprising a reflector optically coupled to the first waveplate, for reflecting the first optical beam back to the first polarization rotator;
wherein the first and second polarization rotators comprise a same polarization rotator; and
wherein the first and second polarizers comprise a same walk-off birefringent crystal.

7. The apparatus of claim 1, further comprising an optical amplifier having a thermal dependence of spectral gain profile, wherein the optical amplifier is optically coupled to the first polarizer for providing the input optical beam, wherein in operation, the thermal dependence of the spectral gain profile of the optical amplifier is lessened by the dependence of the amplitude on the temperature.

8. The apparatus of claim 1, further comprising a light source having a thermal dependence of a spectral characteristic, wherein the light source is optically coupled to the first polarizer for providing the input optical beam, wherein in operation, the thermal dependence of the spectral characteristic of the light source is lessened by the dependence of the amplitude on the temperature.

9. The apparatus of claim 8, wherein the light source comprises an optical amplifier comprising an active medium and a pump source coupled thereto for generating amplified spontaneous emission in the active medium, wherein in operation, the amplified spontaneous emission forms the optical beam for coupling to the first polarizer.

10. The apparatus of claim 9, further comprising a Sagnac interferometer optically coupled to the second polarizer, and a photodetector optically coupled to the Sagnac interferometer.

11. A method for lessening a thermal dependence of a spectral gain profile of an optical amplifier, the method comprising:
 (a) polarizing in an X-direction an output optical beam of the optical amplifier, so as to obtain a first optical beam having a polarization oriented in the X-direction;
 (b) rotating the polarization of the first optical beam away from the X-direction by a first angle dependent on temperature, such that the first optical beam comprises an X-polarization component oriented in the X direction, and a Y-polarization component oriented in a Y-direction perpendicular to the X-direction;
 (c) imparting a non-zero phase shift between the X- and Y-polarization components of the first optical beam, by transmitting the first optical beam through a waveplate having an optical axis oriented substantially in the X-direction or Y-direction;
 (d) rotating the polarization of the first optical beam by the first angle back to the X-direction; and
 (e) polarizing the first optical beam in the X-direction, to obtain an output optical beam;
 wherein a coupling efficiency of the first optical beam into the output optical beam has a wavelength dependence due to the non-zero phase shift between the X- and Y-polarization components of the first optical beam;
 wherein an amplitude of the wavelength dependence is dependent on the first angle and thereby has a dependence on the temperature, such that the thermal dependence of the spectral gain profile of the optical amplifier is lessened by the dependence of the amplitude on the temperature.

12. A method for lessening a dependence of a spectral characteristic of a light source on temperature, the method comprising:
 (a) polarizing in an X-direction an optical beam emitted by the light source, so as to obtain a first optical beam having a polarization oriented in the X-direction;
 (b) rotating the polarization of the first optical beam away from the X-direction by a first angle dependent on temperature, such that the first optical beam comprises an X-polarization component oriented in the X direction, and a Y-polarization component oriented in a Y-direction perpendicular to the X-direction;
 (c) imparting a non-zero phase shift between the X- and Y-polarization components of the first optical beam, by transmitting the first optical beam through a waveplate having an optical axis oriented substantially in the X-direction or Y-direction;
 (d) rotating the polarization of the first optical beam by the first angle back to the X-direction; and
 (e) polarizing the first optical beam in the X-direction, to obtain an output optical beam;
 wherein a coupling efficiency of the first optical beam into the output optical beam has a wavelength dependence due to the non-zero phase shift between the X- and Y-polarization components of the first optical beam;
 wherein an amplitude of the wavelength dependence is dependent on the first angle and thereby has a dependence on the temperature, such that the dependence of the spectral characteristic of the light source on the temperature is lessened by the dependence of the amplitude on the temperature.

\* \* \* \* \*